US012609610B2

(12) United States Patent
Ou et al.

(10) Patent No.: US 12,609,610 B2
(45) Date of Patent: Apr. 21, 2026

(54) APPARATUS AND METHOD FOR CONTROLLING HYBRID THREE-PORT DC-DC POWER CONVERTERS

(71) Applicant: Huawei Digital Power Technologies Co., Ltd., Shenzhen (CN)

(72) Inventors: Shuyu Ou, Kista (SE); Muhammad Yaqoob, Kista (SE); Qingzu Hong, Kista (SE); Wenbo Sun, Nuremberg (DE); Grover Victor Torrico-Bascopé, Kista (SE)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 405 days.

(21) Appl. No.: 18/351,004

(22) Filed: Jul. 12, 2023

(65) Prior Publication Data

US 2023/0361671 A1    Nov. 9, 2023

Related U.S. Application Data

(63) Continuation of application No. PCT/EP2021/050678, filed on Jan. 14, 2021.

(51) Int. Cl.
H02M 3/335    (2006.01)
H02M 3/00    (2006.01)

(52) U.S. Cl.
CPC ......... H02M 3/01 (2021.05); H02M 3/33584 (2013.01); H02M 3/33515 (2013.01)

(58) Field of Classification Search
None
See application file for complete search history.

(56) References Cited

U.S. PATENT DOCUMENTS

2018/0301989 A1* 10/2018 Yamagami .......... H02M 7/4835
2020/0014306 A1* 1/2020 Riar ...................... H02M 3/285

FOREIGN PATENT DOCUMENTS

CN    108365758 A    8/2018
EP    1732200 A1    12/2006

OTHER PUBLICATIONS

Zhao et al., "An Isolated Three-Port Bidirectional DC-DC Converter With Decoupled Power Flow Management", IEEE Transactions on Power Electronics, vol. 23, No. 5, Sep. 2008, 11 pages.
(Continued)

*Primary Examiner* — Peter M Novak
(74) *Attorney, Agent, or Firm* — Maier & Maier, PLLC

(57) ABSTRACT
A control method for a hybrid three-port DC-DC power converter combining a dual active bridge converter and a dual active bridge series resonant converter topology. The controller includes a first control loop to regulate power flow between the first port and the second port and a second control loop to regulate power flow between the second port and the third port. The first control loop employs a three-mode control methodology to regulate power flow through the dual active bridge converter between the first port and the second port. The second control loop is configured with a lower bandwidth than the first control loop and regulates power flow through the dual active bridge series resonant converter between the second port and the third port.

16 Claims, 12 Drawing Sheets

(56) References Cited

OTHER PUBLICATIONS

Nguyen et al., "A new soft-switching strategy for Three-Port Converter to be applied in EV application", 2017 IEEE 3rd International Future Energy Electronics Conference and ECCE Asia (IFEEC 2017 ECCE Asia), Jun. 3, 2017, XP033129675, 6 pages.

Yaqoob et al., "Modeling the Effect of Dead-Time on the Soft-Switching Characteristic of Variable-Frequency Modulated Series-Resonant DAB Converter", 2017 IEEE 18th Workshop on Control and Modeling for Power Electronics (COMPEL), Jul. 9-12, 2017, 8 pages.

Dao et al., "High-Efficiency SiC-Based Isolated Three-Port DC/DC Converters for Hybrid Charging Stations", IEEE Transactions on Power Electronics, Institute of Electrical and Electronics Engineers, Oct. 10, 2020, XP011796515, 11 pages.

Tong et al., "Modeling and Analysis of a Dual-Active-Bridge-Isolated Bidirectional DC/DC Converter to Minimize RMS Current With Whole Operating Range", IEEE Transactions on Power Electronics, vol. 33, No. 6, Jun. 2018, 15 pages.

* cited by examiner

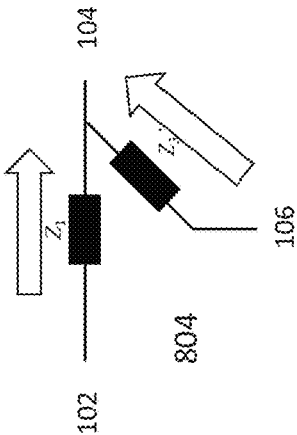
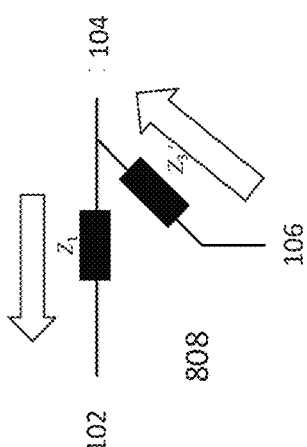
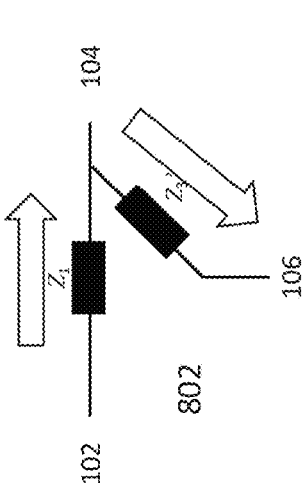
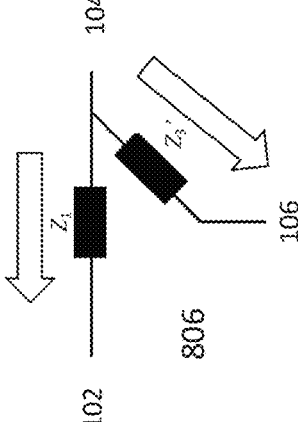
Figure 8

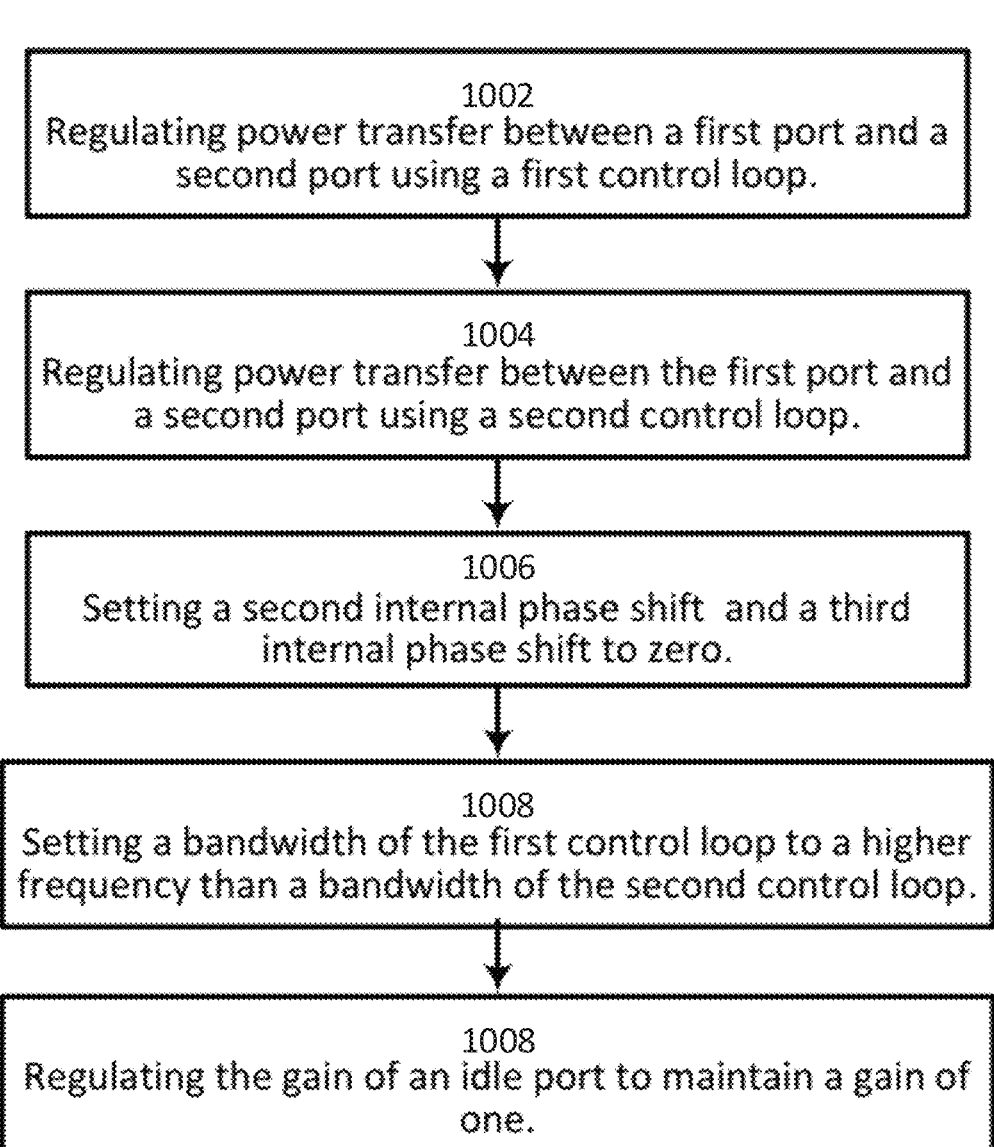

1000

1002
Regulating power transfer between a first port and a second port using a first control loop.

1004
Regulating power transfer between the first port and a second port using a second control loop.

1006
Setting a second internal phase shift and a third internal phase shift to zero.

1008
Setting a bandwidth of the first control loop to a higher frequency than a bandwidth of the second control loop.

1008
Regulating the gain of an idle port to maintain a gain of one.

1202
Generate a control frequency ($f_{sPI}$) and a second control signal ($\varphi_{23Pi}$) based on a second controlled DC voltage ($V_{C2}$) and a second reference voltage ($V_{ref2}$)

1208 - N          1204          Y - 1206
$f_{sPI} > f_{smax}$

1212
$f_s = f_{sPI}$
$\varphi_{23} = \cos^{-1}(M_{23})$

1210
$f_s = f_{smax}$
$\varphi_{23} = \varphi_{23PI}$ $f_s , \varphi_{23}$

APPARATUS AND METHOD FOR CONTROLLING HYBRID THREE-PORT DC-DC POWER CONVERTERS

CROSS-REFERENCE TO RELATED APPLICATIONS

This application is a continuation of International Application No. PCT/EP2021/050678, filed on Jan. 14, 2021, the disclosure of which is hereby incorporated by reference in its entirety.

TECHNICAL FIELD

Aspects of the embodiments relate generally to power conversion apparatuses and to control strategies for multi-port DC-DC power converters.

BACKGROUND

Three port DC-DC power converters capable of integrating multiple variable DC voltage sources can provide increased power density and reduced cost in many modern power systems. For example, a three-port DC-DC power converter can be used in an electric vehicle or electric aircraft to transfer power between an on-board charger (OBC), the low voltage battery and the motor. Optimal performance of a three-port DC-DC converter includes: power decoupling; zero-voltage switching (ZVS) operation; minimum-circulating-current operation; and flexible power flow, which refers to delivering and receiving power among all three ports.

Conventional control approaches result in overly complex control while addressing only a subset of the desired characteristics. In one approach, an optimal set of external phase shifts are derived to decouple different ports, and an internal phase shift at a first port is used to maintain minimal circulating currents. This approach however requires a microcontroller to handle complex control calculations and because ZVS operation is not considered switching losses will exceed desirable levels. Alternate control methods focusing on ZVS operation fail to provide decoupling among the ports.

Another conventional control approach relies on lookup tables to simplify control calculations. However, including OBC operation and wide voltage ranges on all three ports makes the lookup tables difficult to implement.

Thus, there is a need for optimal control methods and apparatus to control hybrid three-port DC-DC power converters and provide flexible power flow operation, simplified power decoupling, and efficient operation with wide ZVS operating range and minimum circulating current.

SUMMARY

Aspects of the embodiments are directed to apparatuses and methods for controlling hybrid three-port DC-DC power converters appropriate for applications requiring multiple DC power sources. Aspects of the embodiments provide optimal control of hybrid three-port DC-DC power converters which benefit from wide range zero-voltage switching (ZVS) operation and minimal circulating currents.

According to a first aspect, the above and further objectives and advantages are obtained by an apparatus. In one embodiment, the apparatus includes a hybrid three-port DC-DC power converter where a first AC power generated by a first port is coupled to a second AC power generated by a second port through an inductive network. The inductive network has a first transformer and a first inductor. The second AC power is coupled to a third AC power generated by a third port through a series resonant network. The series resonant network includes a second transformer and a second inductor coupled in series with a capacitor. The apparatus includes a controller configured to receive a first DC voltage from the first port, a second DC voltage from the second port, and a third DC voltage from the third port. The controller is configured to produce switch control signals to generate the first AC power, the second AC power, and the third AC power based on one or more control parameters. The control parameters include a first internal phase shift, a first external phase shift, a switching frequency, and a second external phase shift. The controller is configured to use a first control loop to regulate power transfer between the first port and the second port, where the first control loop is configured to receive the first DC voltage and the second DC voltage, and generate the first internal phase shift and the first external phase shift. The controller is further configured to use a second control loop to regulate power transfer between the second port and the third port, where the second control loop is configured to receive the second DC voltage and the third DC voltage, and to generate the switching frequency and the second external phase shift. The aspects of the embodiments provide wide range ZVS operation with minimal circulating currents.

In a first possible implementation form of the apparatus according to the first aspect, the controller is configured to set a second internal phase shift within the second AC power to zero and set a third internal phase shift within the third AC power to zero. Setting the second internal phase shift to zero decouples the first port from the third port resulting in simplified control. Setting the third internal phase shift to zero avoids high switching currents thereby reducing switching and conduction losses.

In a possible implementation form of the apparatus, the bandwidth of the first control loop is higher than a bandwidth of the second control loop. The use of different bandwidths enhances decoupling of the two control loops.

In a possible implementation form of the apparatus, the controller is configured to, when one of the first port, the second port, and the third port is idling, regulate a voltage gain between the idling port and an adjacent port to maintain a voltage gain of substantially one. Maintaining a gain of one prevents high circulating currents from being generated at the idling and source ports, thereby preventing conduction and switching losses.

In a possible implementation form of the apparatus, the first control loop is configured to generate a first control signal based on a first controlled DC voltage and a first reference voltage, where, when power is being delivered from the first port to the second port, the first controlled DC voltage is set to the second DC voltage, and when power is being delivered from the second port to the first port, the first controlled DC voltage is set to the first DC voltage. The first control loop generates a mode signal based on the first controlled DC voltage and a voltage gain between the first DC voltage and the second DC voltage. When the first control signal is greater than or equal to the mode signal, the first control loop generates the first external phase shift based on the first control signal and sets the first internal phase shift to zero. When the first control signal is greater than zero and less than the mode signal, the first control loop generates the first external phase shift based on the mode signal and generates the first internal phase shift based on a difference between the mode signal and the first control signal. When the first control signal is less than or equal to zero, the first control loop generates the first external phase shift based on the mode signal and the first control signal and generates the first internal phase shift based on the first controlled DC voltage and a voltage gain between the first DC voltage and the second DC voltage. The use of three control modes provides a wide ZVS operating region for the converter.

In a possible implementation form of the apparatus, the first control loop is operated in buck mode. Keeping the first control loop in buck mode leads to minimum circulating currents.

In a possible implementation form of the apparatus, the second control loop is configured to generate a control frequency and a second control signal based on a second controlled DC voltage and a second reference voltage. When power is being delivered from the third port to the second port the second controlled DC voltage is set to the second DC voltage, and when power is being delivered from the second port to the third port the second controlled DC voltage is set to the third DC voltage. When the control frequency is greater than a maximum switching frequency, the second control loop is configured to set the switching frequency to the maximum switching frequency and generate the second external phase shift corresponding to the second control signal. When the control frequency is not greater than the maximum switching frequency, the second control loop is configured to generate the switching frequency corresponding to the control frequency and generate the second external phase shift based on a gain between the second DC voltage and the third DC voltage. Limiting the switching frequency to a maximum switching frequency maintains the dual active bridge series resonant (DABSR) converter within an efficient portion of the frequency response of the series resonance.

In a possible implementation form of the apparatus, the second external phase shift corresponds to an inverse cosine function of the gain between the second DC voltage and the third DC voltage. Having the second external phase shift follow the inverse cosine of the gain provides minimum circulating current in the DAB SR converter.

In a possible implementation form of the apparatus, the second control loop is operated in buck mode. Operating the second control loop in buck mode helps maintain minimum circulating current.

According to a second aspect, the above and further objectives and advantages are obtained by a method. In one embodiment, the method includes regulating power transfer between a first port and a second port using a first control loop. The first control loop is configured to receive a first DC voltage and a second DC voltage and generate a first internal phase shift and a first external phase shift. The method further includes regulating power transfer between the second port and a third port using a second control loop. The second control loop is configured to receive the second DC voltage and a third DC voltage and generate a switching frequency and a second external phase shift. The aspects of the embodiments provide wide range ZVS operation with minimal circulating currents.

In a possible implementation form of the method according to the second aspect, the method includes setting a second internal phase shift to zero and setting a third internal phase shift to zero. Setting the second internal phase shift to zero decouples the first port from the third port resulting in simplified control. Setting the third internal phase shift to zero avoids high switching currents thereby reducing switching losses.

In a possible implementation form of the method, the method includes setting a bandwidth of the first control loop to a higher frequency than a bandwidth of the second control loop. The use of different bandwidths enhances decoupling and independence of the two control loops.

In a possible implementation form of the method, when one of the first port, the second port, and the third port is idling, the method includes regulating a voltage gain between the idling port and an adjacent port to maintain a voltage gain of substantially one. Maintaining a gain of one prevents high circulating currents from being generated at the idling and source ports thereby preventing conduction and switching losses.

In a possible implementation form of the method, the method includes generating a first control signal based on a first controlled DC voltage and a first reference voltage. When power is being delivered from the first port to the second port, the first controlled DC voltage is set to the second DC voltage, and when power is being delivered from the second port to the first port, the first controlled DC voltage is set to the first DC voltage. The method includes generating a mode signal based on the first controlled DC voltage and a voltage gain between the first DC voltage and the second DC voltage. When the first control signal is greater than or equal to the mode signal the method generates the first external phase shift based on the first control signal and sets the first internal phase shift to zero. When the first control signal is greater than zero and less than the mode signal, the method generates the first external phase shift based on the mode signal and generates the first internal phase shift based on a difference between the mode signal and the first control signal. When the first control signal is less than or equal to zero, the method generates the first external phase shift based on a sum of the mode signal and the first control signal and generates the first internal phase shift based on the first controlled DC voltage and a voltage gain between the first DC voltage and the second DC voltage. The use of three control modes provides a wide ZVS operating region for the converter.

In a possible implementation form the method, the method further includes generating a control frequency and a second control signal based on a second controlled DC voltage and a second reference voltage. When power is being delivered from the third port to the second port the second controlled DC voltage is set to the second DC voltage, and when power is being delivered from the second port to the third port the second controlled DC voltage is set to the third DC voltage. When the control frequency is greater than a maximum switching frequency, the method sets the switching frequency to the maximum switching frequency and generates the second external phase shift corresponding to the second control signal. When the control frequency is not greater than the maximum switching frequency, the method generates the switching frequency corresponding to the control frequency and generates the second external phase shift based on a gain between the second DC voltage and the third DC voltage. Limiting the switching frequency to a maximum switching frequency maintains the DABSR converter within an efficient portion of the frequency response of the series resonance.

These and other aspects, implementation forms, and advantages of the embodiments will become apparent from the embodiments described herein and considered in conjunction with the accompanying drawings. It is to be understood, however, that the description and drawings are solely for purposes of illustration and not as a definition of limits of the embodiments. Additional aspects and advantages of the embodiments will be set forth in the description that follows, and in part will be clear from the description, or may be understood by practice of the embodiments. Moreover, the aspects and advantages of the embodiments may be realized and obtained by any of a variety of instrumentalities and combinations as understood by one of ordinary skill in the art.

BRIEF DESCRIPTION OF THE DRAWINGS

In the following, aspects and implementations will be explained in more detail with reference to the embodiments shown in the drawings, in which like references indicate like elements and:

FIG. 8 illustrates an example of an equivalent delta transformation of the exemplary hybrid three-port DC-DC power converter showing the four power flow scenarios;

FIG. 10 illustrates a flow diagram of an exemplary method for controlling a hybrid three-port DC-DC power converter;

DETAILED DESCRIPTION OF THE EMBODIMENTS

Figure 1:
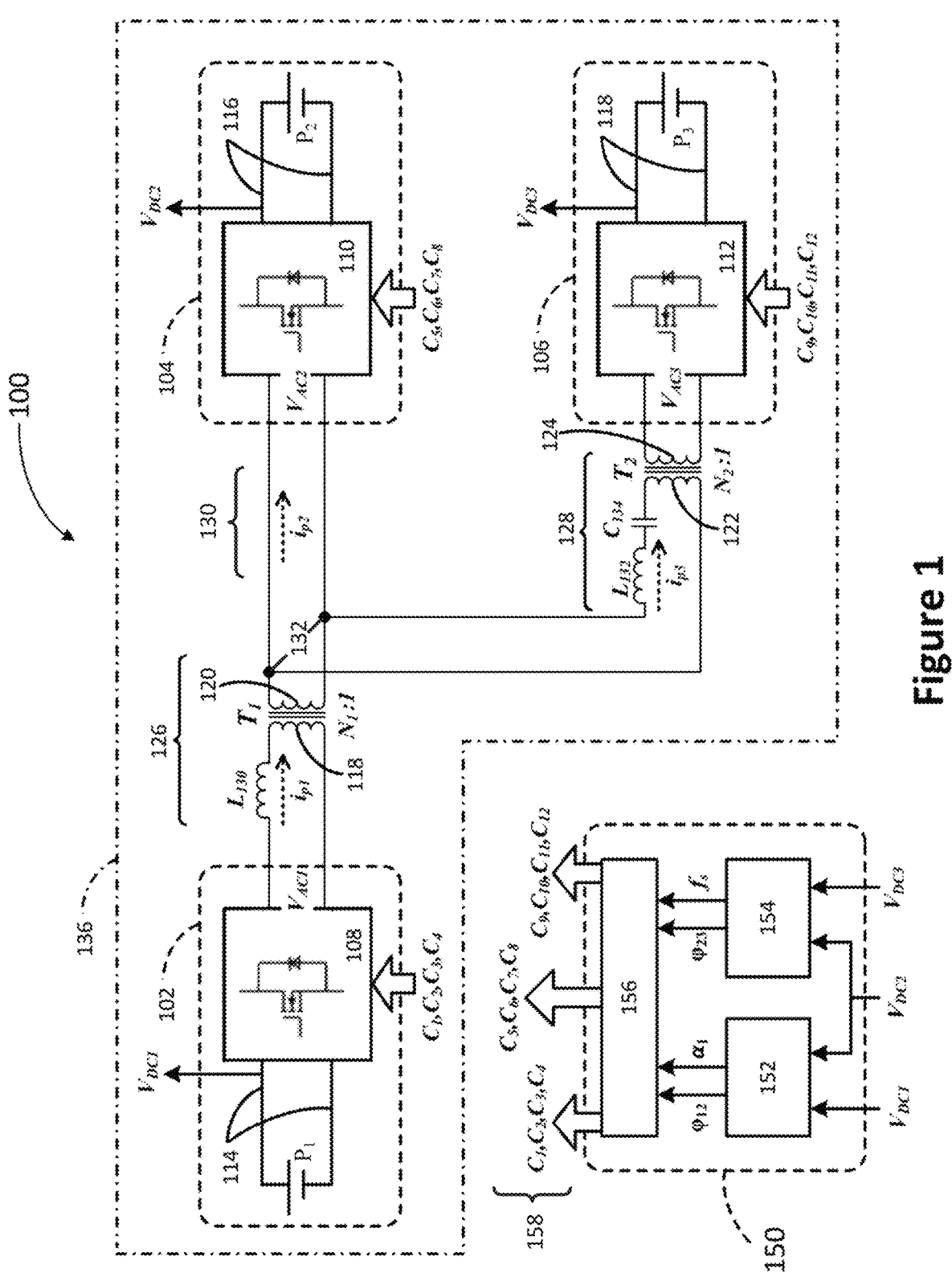
FIG. 1 illustrates a block diagram of an exemplary hybrid three port DC-DC power converter.

Referring to FIG. 1, a simplified block diagram of a hybrid three-port DC-DC power converter apparatus 100 is illustrated. The apparatus 100 of the embodiments is directed to a hybrid three-port DC-DC power converter employing a controller 150 having dual independent control loops 152, 154 configured to regulate power flow between the three ports 102, 104, 106. The apparatus 100 may be connected to three independent power sources $P_1$, $P_2$, $P_3$ and is suitable for use in many modern power applications requiring three variable DC voltages, such as various types of electric vehicles (EV) which benefit from an on-board charging (OBC) application along with a high-voltage (HV) engine port, and a low-voltage (LV) battery port.

Referring to FIG. 1, in one embodiment, the apparatus 100 includes a hybrid three-port DC-DC power converter. A first AC power ($V_{AC1}$) generated by a first port 102 is coupled to a second AC power ($V_{AC2}$) generated by a second port 104 through an inductive network 126. The inductive network 126 includes a first transformer $T_1$ and a first inductor L130. The second AC power ($V_{AC2}$) is coupled to a third AC power ($V_{AC3}$) generated by a third port 106 through a series resonant network 128. In one embodiment, the series resonant network 128 includes a second transformer $T_2$ and a second inductor L132 coupled in series with a capacitor C134.

A controller 150 is configured to receive a first DC voltage $V_{DC1}$ from the first port 102, a second DC voltage $V_{DC2}$ from the second port 104 and a third DC voltage $V_{DC3}$ from the third port 106 and produce switch control signals C1, C2, C3, . . . , C11, C12. The switch control signals C1, C2, C3, . . . , C11, C12 are configured to generate the first AC power $V_{AC1}$, the second AC power $V_{AC2}$, and the third AC power $V_{AC3}$ based on one or more control parameters. The control parameters include a first internal phase shift al, a first external phase shift $\varphi_{12}$, a switching frequency $f_s$, and a second external phase shift ($\varphi_{23}$), The controller 150 is configured to use a first control loop 152 to regulate power transfer between the first port 102 and the second port 104 The first control loop 152 is configured to receive the first DC voltage $V_{DC1}$ and the second DC voltage $V_{DC2}$, and generate the first internal phase shift $\alpha_1$ and the first external phase shift $\varphi_{12}$. The controller 150 is also configured to use a second control loop 154 to regulate power transfer between the second port 104 and the third port 106. The second control loop 154 is configured to receive the second DC voltage $V_{DC2}$ and the third DC voltage $V_{DC3}$, and to generate the switching frequency $f_s$ and the second external phase shift $\varphi_{23}$.

In one embodiment, the three DC power sources $P_1$, $P_2$, $P_3$ may be any suitable type of DC power source. For example, the first DC power source $P_1$ may be a DC-voltage bus regulated by a power factor correction (PFC) stage, the second DC power source $P_2$ may be a HV battery, and the third DC power source $P_3$ may be a LV battery.

The first port 102 includes a full bridge switching network 108 coupled to a first DC power rail 114 and is configured to produce a first AC voltage $V_{AC1}$. The first DC power rail 114 is configured to exchange power with the first DC power source $P_1$. In one embodiment, the first DC power source $P_1$ may include a PFC controlled DC-voltage bus.

The second port 104 includes a second full bridge switching network 110 coupled to a second DC power rail 116 and is configured to produce a second AC voltage $V_{AC2}$. The second DC power rail 116 is configured to exchange power with the second DC power source $P_2$. In some embodiments, the second DC power source $P_2$ may include a HV battery.

The third port 106 includes a third full bridge switching network 112 coupled to a third DC power rail 118 and is configured to produce a third AC voltage $V_{AC3}$. The third DC power rail 118 is configured to exchange power with a third DC power source $P_3$. In some embodiments, the third DC power source $P_3$ may include a LV battery.

As an aid to understanding, the three DC power sources $P_1$, $P_2$, $P_3$ are illustrated as being included within the three ports 102, 104, 106 of the apparatus 100 shown in FIG. 1. Alternatively, in some embodiments, the three DC power sources $P_1$, $P_2$, $P_3$ can be independent power sources external to the apparatus 100 and coupled with the corresponding DC power rail 114, 116, 118.

As shown in FIG. 1, the first AC power $V_{AC1}$ is coupled to the second AC power $V_{AC2}$ through an inductive network 126. In the example of FIG. 1, the inductive network 126 includes a first transformer $T_1$ and a first inductor $L_{130}$. The second AC power $V_{AC2}$ is coupled to a third AC power $V_{AC3}$ through a series resonant network 128. In the example of FIG. 1, the series resonant network 128 includes a transformer $T_2$ and an inductor $L_{132}$ coupled in series with a capacitor $C_{134}$. The use of asymmetric impedances via the inductive network 126 and series resonant network 128 makes the power-transfer characteristics between the first port 102 and the second port 104 different from the power transfer characteristics between the second port 104 and the third port 106.

The inductive network 126 creates a dual-active-bridge (DAB) converter between the first port 102 and the second port 104 and the series resonant network 128 creates a dual active bridge series resonant (DABSR) converter between the second port 104 and the third port 106. The combination of these two converter types within a single three-port DC-DC converter is referred to herein as a hybrid three-port DC-DC power converter.

The first transformer $T_1$ is configured to have turns ratio $N_1$:1. In the exemplary apparatus 100, the primary winding 118 has a greater number of turns than the secondary winding 120 resulting in a turns ratio where $N_1$ is greater than one and the first port 102 has a voltage that is higher than the voltage of the second port 104. Alternatively, the turns ratio $N_1$ may be less than one resulting in the first port 102 having a lower voltage than the voltage of the second port 104.

Similarly, the second transformer $T_2$ is configured to have a primary winding 122 with a greater number of turns than the secondary winding 124 yielding a turns ratio for the second transformer of $N_2$:1 where $N_2$ is greater than one. Thus, the primary side 122 of the second transformer $T_2$ has lower current and higher voltage than the current and voltage of the secondary side 124. Alternatively, the turns ratio of the second transformer $T_2$ may be configured to have $N_2$ less than one.

Disposing the series resonant network $L_{132}$, $C_{134}$ on the primary side 122 of the second transformer $T_2$, which in the illustrated embodiment has lower current and higher voltage than the secondary side 124, reduces conduction loss of the DABSR converter formed between the second port 102 and the third port 104. Similarly, the first inductor $L_{130}$ may be placed on the primary side 118 of the first transformer $T_1$. The use of two independent transformers $T_1$, $T_2$ to integrate the ports of the apparatus 100 improves overall conduction losses within the converter 100.

The hybrid three-port DC-DC converter topology 136 employs asymmetric impedances 126, 128, 130 to connect the first port 102, the second port 104, and the third port 106 with a central converter node 132. The first impedance or inductive network 126 is purely inductive. The second impedance 130 has substantially zero impedance, and the third impedance or series resonant network 128 is a series resonant impedance. This arrangement of asymmetric impedances 126, 128, 130 effectively decouples the first port 102 from the third port 106 thereby preventing disturbances on the first DC power source $P_1$ from effecting the third DC power source $P_3$ and vice versa. Further, because each of the first impedance 126 and third impedance 128 exhibit different power transfer characteristics, power transfer between the first port 102 and the second port 104 can be controlled independently from power transfer between the second port 104 and the third port 106. Decoupling the ports 102, 104, 106 in this fashion allows the DAB converter to be controlled independently from the DABSR converter.

As shown in the example of FIG. 1, the hybrid three-port DC-DC power converter 100 includes two portions: a converter topology 136 and a controller 150. As used herein the term converter topology 136 refers to power handling components and more particularly the arrangement of power handling components 136 used to transfer power among the three ports 102, 104, 106. The term controller 150 refers to the electronics and circuits used to generate control signals 158. The control signals 158 are used to operate the full bridge switching networks 108, 110, 112 which are part of the converter topology 136.

The controller 150 incorporates two independent control loops 152, 154. The first control loop 152 regulates power transfer between the first port 102 and the second port 104, and the second control loop 154 regulates power transfer between the second port 104 and the third port 106. Independence of the two control loops 152, 154 is achieved by having each of the first and second control loops 152, 154 generate different control parameters. The first control loop 152 generates a first internal phase shift $\alpha_1$ and a first external phase shift $\varphi_{12}$. As will be described further below, the first internal phase shift $\alpha_1$ represents a delay within the first AC voltage $V_{AC1}$ that leads to a three level AC voltage, and the first external phase shift $\varphi_{12}$ represents a phase relation between the first AC Voltage $V_{AC1}$ and the second AC voltage $V_{AC2}$. Control of the DAB converter formed between the first port 102 and the second port 104 is accomplished through regulation of the first internal phase shift $\alpha_1$ and the first external phase shift $\varphi_{12}$ by the first control loop 152.

The second control loop 154 generates a second external phase shift $\varphi_{23}$ and a switching frequency $f_s$. The second external phase shift $\varphi_{23}$ represents a phase relation between the second AC voltage $V_{AC2}$ and the third AC voltage $V_{AC3}$. The switching frequency $f_s$ is the switching frequency of all three full bridge switching networks 108, 110, 112. Control of the DABSR converter formed between the second port 104 and the third port 106 is accomplished through regulation of the second external phase shift $\varphi_{23}$ and the switching frequency $f_s$ by the second control loop 154.

The four control parameters (first internal phase shift $\alpha_1$, first external phase shift $\varphi_{12}$, second external phase shift $\varphi_{23}$, and switching frequency $f_s$) are used by the control signal generator or controller 156 to generate control signals 158 which operate the switching networks 108, 110, 112 to generate and adapt the AC voltages $V_{AC1}$, $V_{AC2}$' $V_{AC3}$ to regulate power at the three ports 102, 104, 106.

Figure 2:
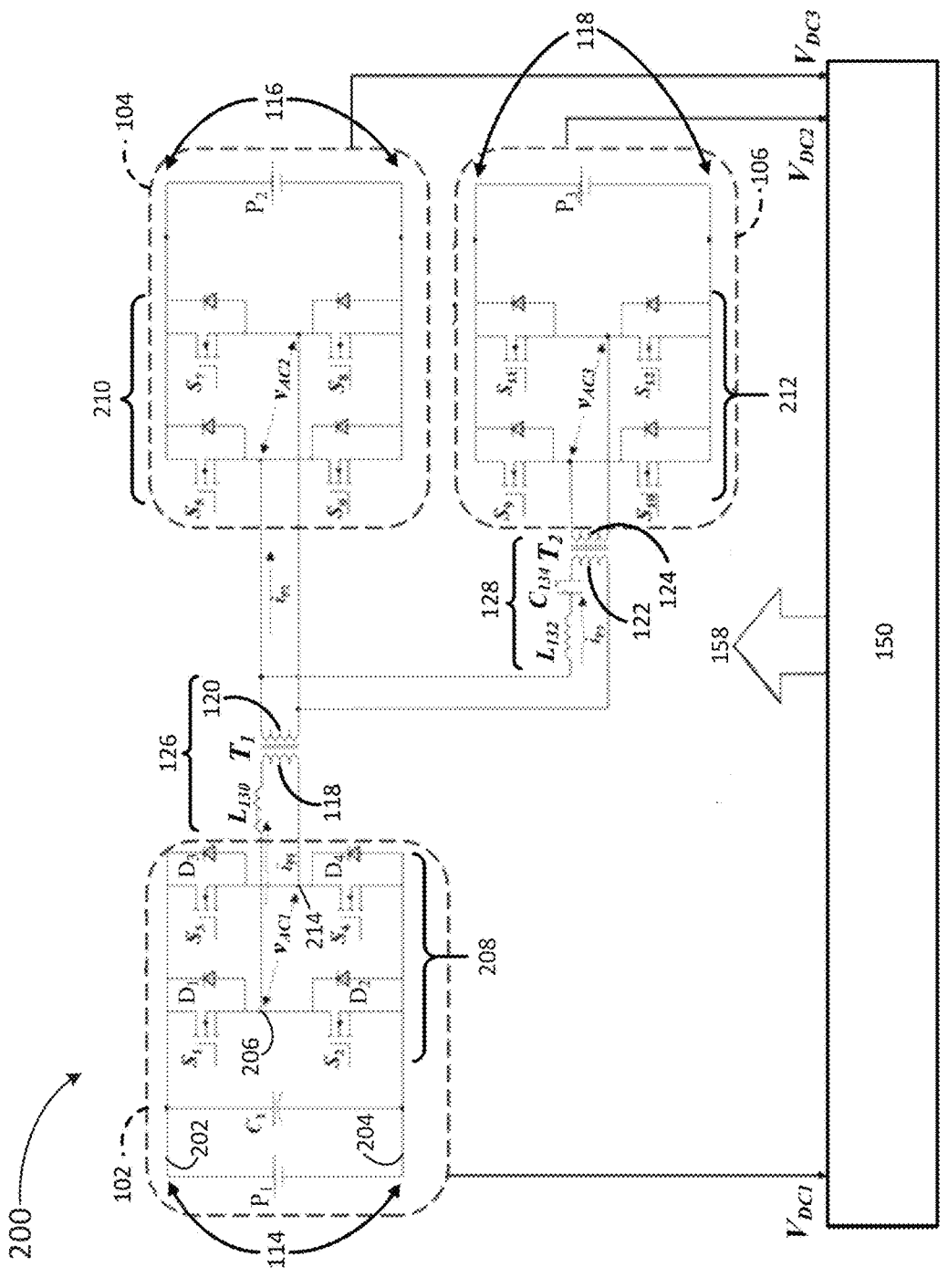
FIG. 2 illustrates a block diagram of an exemplary hybrid three-port DC-DC power converter including details of exemplary full bridge switching networks.

FIG. 2 illustrates a schematic representation of an exemplary power converter apparatus 200 incorporating aspects of the embodiments. The exemplary apparatus 200 is directed to a hybrid three-port DC-DC power converter having full bridge switching networks 208, 210, 212 incorporated in each port 102, 104, 106 and configured to convert between a DC power source $P_1$, $P_2$, $P_3$ and an AC voltage $V_{AC1}$, $V_{AC2}$, $V_{AC3}$ respectively. The exemplary apparatus 200 is similar to the exemplary apparatus 100 described above and with reference to FIG. 1 where like references indicate like elements.

The full bridge switching networks 208, 210, 212 illustrated in FIG. 2 are configured to perform the same function as, and show a possible implementation of, the full bridge switching networks 108, 110, 112 described above. In the illustrated apparatus 200 the same full bridge switching network implementation 208, 210, 212 is employed in all three ports 102, 104, 106, and as an aid to understanding, operation of only the first full bridge switching network 208 is described in detail below. It should be understood that all three full bridge switching networks 208, 210, 212 are configured to operate in the same fashion as the first full bridge switching network 208 described above.

The exemplary full bridge switching network 208 includes a positive DC rail 202 and a negative DC rail 204 referred to collectively herein as a DC power rail 114. The DC power rail 114 is coupled in parallel with a DC power source $P_1$. In some embodiments it is advantageous to include a filter capacitor $C_1$ coupled in parallel with the DC power source $P_1$ to remove unwanted high frequency fluctuations from the DC power source $P_1$.

In the example of FIG. 2, first pair of switches $S_1$, $S_2$ are coupled in series between the positive DC rail 202 and the negative DC rail 204 and form a first central node 206. A second pair of switches $S_3$, $S_4$ is coupled in series between the positive DC rail 202 and the negative DC rail 204 and form a second central node 214. The four switches $S_1$, $S_2$, $S_3$, $S_4$ are operated to provide an AC power $V_{AC1}$ across the two central nodes 206, 214.

In the illustrated embodiment, each switch $S_1$, $S_2$, $S_3$, $S_4$ is coupled in parallel with a respective free-wheeling diode $D_1$, $D_2$, $D_3$, $D_4$ to protect the corresponding switch $S_1$, $S_2$, $S_3$, $S_4$ from voltage stresses. The diodes $D_1$, $D_2$, $D_3$, $D_4$ may be integrated with the switches themselves or when desired may be implemented using separate devices. The exemplary full bridge switching network 208 is illustrated with field effect transistors having diode protection, however those skilled in the art will readily recognize that any appropriate switching device capable of switching the desired power at the desired frequencies may be advantageously employed without straying from the spirit and scope of the embodiments.

In the apparatus 200, all three full bridge switching networks 208, 210, 212 are illustrated as having the same implementation. Alternatively, different implementations of full bridge switching networks may be advantageously employed in each of the three ports 102, 104, 106 without straying from the spirit and scope of the embodiments.

Figure 3:
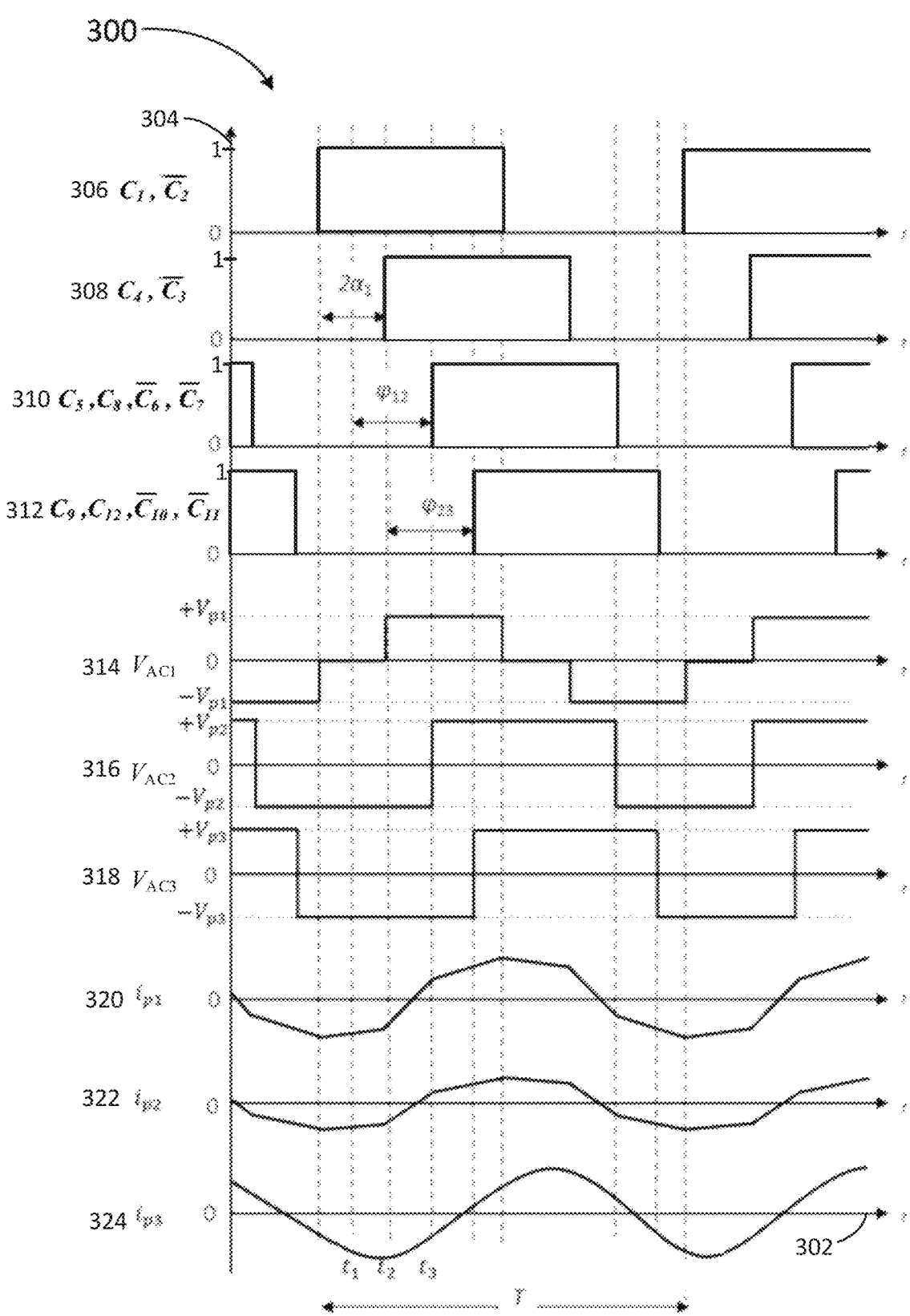
FIG. 3 illustrates graphs showing examples of primary waveforms for an exemplary hybrid three-port DC-DC power converter.

FIG. 3 illustrates graphs 300 showing exemplary primary waveforms for a hybrid three-port DC-DC converter incorporating aspects of the embodiments. The primary waveforms illustrated in graphs 300 are representative of primary waveforms generated within an exemplary hybrid three-port DC-DC converter such as the apparatus 200 described above with respect to FIG. 2. In the graphs 300, time is depicted along the horizontal axis 302 increasing to the right while magnitude is depicted along the vertical axis 304 increasing upwards.

The first four graphs 306, 308, 310 and 312 illustrate the twelve control signals 158, also referenced as $C_1$, $C_2$, . . . , $C_{12}$, generated by the controller 150 that are used to operate the twelve switching devices $S_1$, $S_2$, . . . , $S_{12}$ respectively, in each of the three full bridge switching networks 208, 210, 212. In the graphs 306, 308, 310, 312 a value of one (1) turns the corresponding switching device on and a value of zero (0) turns the corresponding switching device off, where "on" means the switching device is conducting and "off" means the switching device is not conducting. Control signals marked with an overline, such as $\overline{C_2}$, indicate an inverted signal. When the inverted signal has a value of one (1) the corresponding switching device is off and an inverted signal having a value of zero turns the corresponding switching device on.

The first two graphs 306 and 308 illustrate control signals $C_1$, $\overline{C_2}$ and $C_4$, $\overline{C_3}$ used to operate corresponding switching devices $S_1$, $S_2$, $S_4$, $S_3$ of the first full bridge switching network 208. The graph 314 illustrates the first AC voltage $V_{AC1}$ produced by the first full bridge switching network 208 when operated by the control signals shown in graphs 306 and 308. One full cycle T is marked along the time axis 302 where one full cycle T is equal to one over the switching frequency ($T=1/f_s$). Time $t_1$ marks the nominal switching time of the first full bridge switching network 208. The first internal phase shift a1 represents a time delay or phase shift from the nominal transition time $t_1$ to the actual transition time $t_2$.

The first internal phase shift $\alpha_1$, which is used as a control parameter by the first control loop 152, represents an offset or shift from the nominal transition time $t_1$ to the actual transition time $t_2$. When the first internal phase shift $\alpha_1$ is zero, the rising edge of the first AC voltage occurs at the nominal transition time $t_1$ and the first AC voltage $V_{AC1}$ becomes a two-level waveform. A non-zero first internal phase shift generates a first AC voltage $V_{AC1}$ having three levels: $+V_{p1}$, zero, and $-V_{p1}$, where $V_{p1}$ is the DC voltage level of the first DC power source $P_1$. Graph 314 illustrates the first AC voltage $V_{AC1}$ when the first internal phase shift $\alpha_1$ is greater than zero.

Graph 310 shows control signals $C_8$, $C_8$, $\overline{C_6}$, $\overline{C_7}$ used to operate corresponding switching devices $S_8$, $S_8$, $S_6$, $S_7$ in the second full bridge switching network 210. The second AC voltage $V_{AC2}$ generated by the second full bridge switching network 210 is shown in graph 316. The second full bridge switching network 210 is operated without any internal phase shift leading to a fifty percent duty cycle and a second AC voltage $V_{AC2}$ having two voltage levels $\pm V_{p2}$ as shown in graph 316.

The first external phase shift $\varphi_{12}$, which is used as a control parameter by the first control loop 152, represents a time delay or phase shift from the nominal switching time of the first half bridge switching network $t_1$ until the second half bridge switching network changes state at time $t_3$. Varying the first external phase shift $\varphi_{12}$ changes the phase relationship between the first AC voltage $V_{AC1}$ and the second AC voltage $V_{AC2}$ thereby regulating power transfer between the first port 102 and the second port 104. Changing the sign of the first external phase shift $\varphi_{12}$ changes the direction of power flow between the first port 102 and the second port 104.

Graph 312 shows control signals $C_9$, $C_{12}$, $\overline{C_{10}}$, $\overline{C_{11}}$ used to operate corresponding switching devices $S_9$, $S_{12}$, $S_{10}$, $S_{11}$ in the third full bridge switching network 212. The third AC voltage $V_{AC3}$ shown in graph 318 is generated by the third full bridge switching network 212 when operated using the control signals $C_9$, $C_{12}$, $\overline{C_{10}}$, $\overline{C_{11}}$ shown in graph 312. The third full bridge switching network 212 is operated without any internal phase shift leading to a fifty percent duty cycle and a third AC voltage $V_{AC3}$ having two voltage levels $\pm V_{p3}$.

The phase shift between the control signals $C_5$, $C_8$, $\overline{C_6}$, $\overline{C_7}$ and $C_9$, $C_{12}$, $\overline{C_{10}}$, $\overline{C_{11}}$ is referred to as the second external phase shift $\varphi_{23}$ and is used as a control parameter by the second control loop 154 and the control signal generator 156. Varying the second external phase shift $\varphi_{23}$, changes the phase relationship between the second AC voltage $V_{AC2}$ and the third AC voltage $V_{AC3}$ thereby regulating power transfer between the second port 104 and the third port 106. Changing the sign of the second external phase shift $\varphi_{23}$ changes the direction of power flow between the second port 104 and the third port 106.

Graphs 320, 322 and 324 show corresponding exemplary current waveforms for the currents $i_{p1}$, $i_{p2}$, and $i_{p3}$ shown in FIGS. 1 and 2. Due to the impedance 126 being purely inductive, the current flow $i_{p1}$ and $i_{p2}$ shown in graphs 320 and 322 are piecewise linear. The current $i_{p3}$ shown in graph 324 is near sinusoidal due to the series resonant impedance 128.

Based on the selected four control parameters (first internal phase shift $\alpha_1$, first external phase shift $\varphi_{12}$, second external phase shift $\varphi_{23}$, and switching frequency $f_s$) power equations of the three ports 102, 104, 106 can be derived as shown in equation (1) through equation (3):

$$P_{o1} = \frac{8 M_{12} V_{p1}^2 \cos(\alpha_1)\sin(\varphi_{12})}{\pi^2 Z_1} \qquad \text{Equation (1)}$$

$$P_{o2} = \frac{8 M_{12} V_{p1}^2 \cos(\alpha_1)\sin(\varphi_{12})}{\pi^2 Z_1} - \frac{8 M_{23} V_{p2}^2 \sin(\varphi_{23})}{\pi^2 Z_3} \qquad \text{Equation (2)}$$

$$P_{o3} = \frac{8 M_{23} V_{p2}^2 \sin(\varphi_{23})}{\pi^2 Z_3} \qquad \text{Equation (3)}$$

where $M_{12}$ is the voltage gain between the first DC power source $P_1$ and the second DC power source $P_2$, $M_{23}$ is the voltage gain between the second DC power source $P_2$ and the third DC power source $P_3$, and $V_{P1}$, $V_{P2}$, $V_{P3}$ are the voltages of the first, second, and third DC power source $P_1$, $P_2$, $P_3$ respectively. The gains $M_{12}$ and $M_{23}$ are given by equation (4) and equation (5):

$$M_{12} = \frac{N_1 V_{p2}}{V_{p1}} \qquad \text{Equation (4)}$$

$$M_{23} = \frac{N_2 V_{p3}}{V_{p2}} \qquad \text{Equation (5)}$$

where $N_1$ is the turns ratio of the first transformer $T_1$, and $N_2$ is the turns ration of the second transformer $T_2$. $Z_1$ represents the frequency dependent impedance of the first impedance 126 and $Z_2$ represents the frequency dependent impedance of the second impedance 128 as given by equation (6) and equation (7):

$$Z_1 = 2\pi f_s L_1 \qquad \text{Equation (6)}$$

$$Z_3 = 2\pi f_s L_3 - \frac{1}{2\pi f_s C_3} \qquad \text{Equation (7)}$$

The power equations (1) through (6) show that switching frequency $f_s$ is the only control variable that links all three ports 102, 104, 106. This is due to the frequency dependence of the two impedances $Z_1$, $Z_2$ as shown in equation (6) and equation (7).

Optimal control of power flow between the first port 102 and the second port 104 focuses on achieving wide-range ZVS operation and minimum-circulating current. The first control loop 152 is configured to achieve these objectives by employing the first internal phase shift $\alpha_1$ and the first external phase shift $\varphi_{12}$ as control parameters to regulate power flow between the first port 102 and the second port 104. Use of the first internal phase shift $\alpha_1$ as a control parameter suggests the DAB converter between the first and second ports 102, 104 should be operated in buck mode ($V_{p1} > N_1 V_{p2}$ or $M_{12} < 1$) to achieve minimum-circulating current.

To maintain ZVS operation three control modes will be employed where the boundary conditions for the three modes are given by equations (8) through (17). A mode signal $\varphi'_{12}$ and preliminary internal phase shift $\alpha'_1$ are given by equations (8) and (9) respectively:

$$\varphi'_{12} = \qquad \text{Equation (8)}$$
$$\max\left(\frac{\pi}{2}\left(1 - \frac{1}{M_{12}}\right) + \frac{L_1 I_{zvsp1}\pi}{T V_{p1} M_{12}}, \frac{\pi}{2}(1 - M_{12}) + \frac{L_1 I_{zvsp2}\pi}{N_{12} T V_{p1}}\right)$$

$$\alpha'_1 = \frac{V_{p1} T((1 - M_{12})\pi + 2\varphi_{12} M_{12}) - 2 L_2 I_{zvsp2}\pi}{2 V_{p1} T(M_{12} + 1)} \qquad \text{Equation (9)}$$

Where $I_{zvsp1}$ and $I_{zvsp2}$ are the minimum current required to achieve ZVS switching at the first port 102 and the second port 104, respectively.

During the first control mode the first internal phase shift $\alpha_1$ is set to zero. Boundary conditions for the first control mode are given by equations (10) and (11):

$$\varphi'_{12} \le \varphi_{12} \le \frac{\pi}{2} \qquad \text{Equation (10)}$$

$$\alpha_1 = 0 \qquad \text{Equation (11)}$$

During the second control mode the first internal phase shift $\alpha_1$ is less than the first external phase shift $\varphi_{12}$. Boundary conditions for the second control mode are given by equations (12) through (14):

$$\alpha_1 < \varphi_{12} \qquad \text{Equation (12)}$$

$$\varphi_{12} = \varphi'_{12} \qquad \text{Equation (13)}$$

$$0 \le \alpha_1 \le \alpha'_1 \qquad \text{Equation (14)}$$

During the third control mode first internal phase shift $\alpha_1$ is greater than the first external phase shift $\varphi_{12}$. Boundary conditions for the third control mode are given by equations (15) through (17):

$$\varphi'_{12} \le \alpha_1 \le \frac{\pi}{2} \qquad \text{Equation (15)}$$

$$0 \le \varphi_{12} < \varphi'_{12} \qquad \text{Equation (16)}$$

$$\alpha_1 = \frac{\pi}{2} - \frac{V_{p1} T \varphi_{12} M_{12} + L_1 I_{zvsp1}\pi}{V_{p1} T(1 - M_{12})} \qquad \text{Equation (17)}$$

The method for selecting each control mode and computing the control parameters will be discussed further below.

The first external phase shift $\varphi_{12}$ may vary through its full range of minus ninety degrees to plus ninety degrees [−90°, 90°]. When the external phase shift $\varphi_{12}$ is positive power flows from the first port 102 to the second port 104, and when the external phase shift $\varphi_{12}$ is negative power flows in the opposite direction from the second port 104 to the first port 102.

Figure 4:
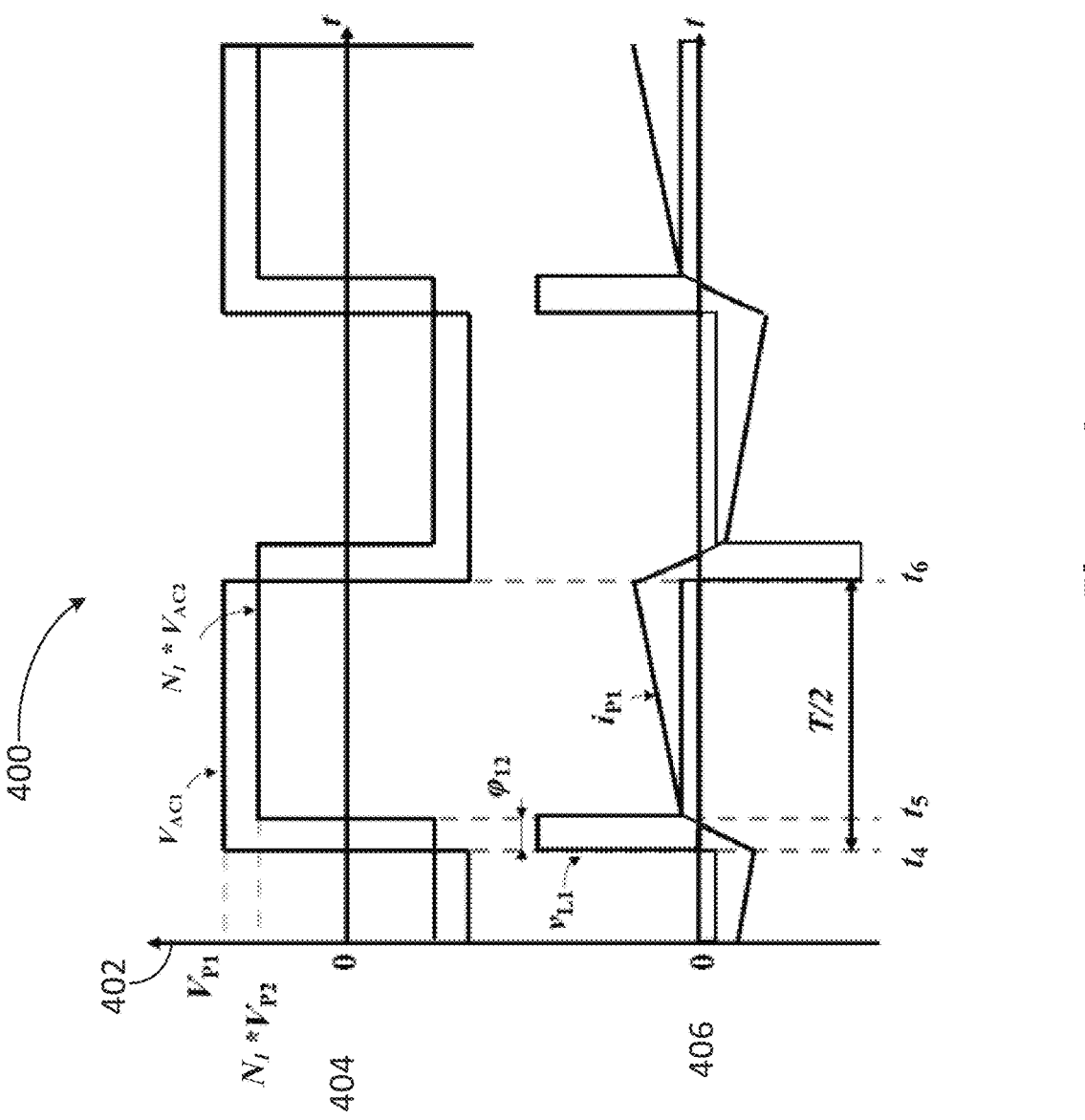
FIG. 4 illustrates graphs showing examples of primary waveforms generated by an exemplary first control loop during a first control mode.

FIG. 4 illustrates graphs 400 showing representative waveforms corresponding to the first control mode. Graphs 400 depict time along a horizontal axis t increasing to the right, and magnitude along a vertical axis 402 increasing upwards. A half cycle T/2 of the first AC voltage $V_{AC1}$ is marked along the horizontal axis beginning at time $t_4$. A second time is marks the rising edge of the second AC voltage $V_{AC2}$ and a third time $t_6$ marks the falling edge of the first AC voltage $V_{AC1}$ which is also where half cycle T/2 ends. The first external phase $\varphi_{12}$ shift controls a difference in phase or time between the two AC voltages $V_{AC1}$ and $V_{AC2}$.

The upper graph 404 shows the first AC voltage $V_{AC1}$ and the second AC voltage $V_{AC2}$ with the second AC voltage $V_{AC2}$ being adjusted by the first transformer turns ratio $N_1$. The voltage of the first DC power source $V_{p1}$ and the voltage of the second DC power source $V_{p2}$ adjusted for the first transformer turns ratio $N_1*V_{p2}$ are marked on the horizontal axis 402. During the first control mode the first internal phase shift $\alpha_1$ is set to zero so both AC voltages $V_{AC1}$, $V_{AC2}$ are two level waveforms. When the first internal phase shift is zero, the first AC voltage $V_{AC1}$ changes state at the nominal transition time $t_4$. The lower graphs 406 show voltage $v_{L1}$ and current $i_{p1}$ in the first inductor $L_{130}$.

Figure 5:
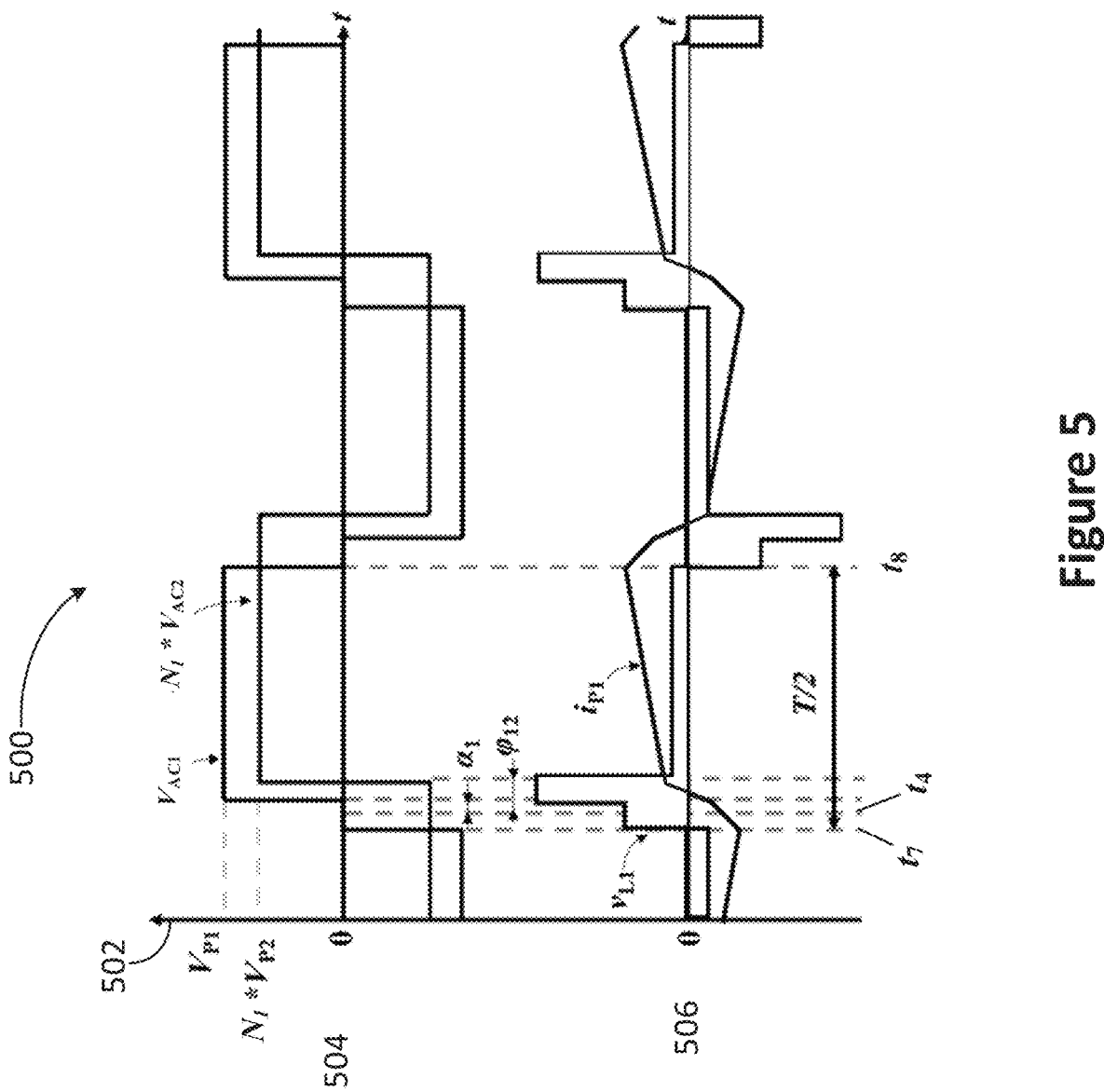
FIG. 5 illustrates graphs showing examples of primary waveforms generated by an exemplary first control loop during a second control mode.

FIG. 5 illustrates graphs 500 showing representative waveforms corresponding to the second control mode. Graphs 500 depict time along a horizontal axis t increasing to the right, and magnitude along a vertical axis 502 increasing upwards. A half cycle T/2 of the first AC voltage $V_{AC1}$ is marked along the horizontal axis beginning at time $t_7$ and ending at time h. The nominal switching time of the first AC voltage $V_{AC1}$ is marked as $t_4$.

The upper graphs 504 show the first AC voltage $V_{AC1}$ and the second AC voltage $V_{AC2}$ with the second AC voltage $V_{AC2}$ being adjusted by the first transformer turns ratio $N_1$. The voltage of the first DC power source $V_{p1}$ and the voltage of the second DC power source $V_{p2}$ adjusted for the first transformer turns ratio $N_1*V_{p2}$ are marked on the horizontal axis 502. In the second control mode the first internal phase shift $\alpha_1$ is greater than zero resulting in the first AC voltage $V_{AC1}$ having three voltage levels: $+V_{p1}$, $-V_{p1}$, and zero. The first internal phase shift $\alpha_1$ is shown as a time or a phase difference between the nominal transition time $t_4$ and the rising edge of the first AC voltage $V_{AC1}$. The first external phase shift $\varphi_{12}$ is shown in graph 506 as the time between the nominal transition time $t_4$ and a rising edge of the second AC voltage $V_{AC2}$. The lower graphs 506 show the corresponding voltage $v_{L1}$ and current $i_{p1}$ in the first inductor $L_{130}$.

Figure 6:
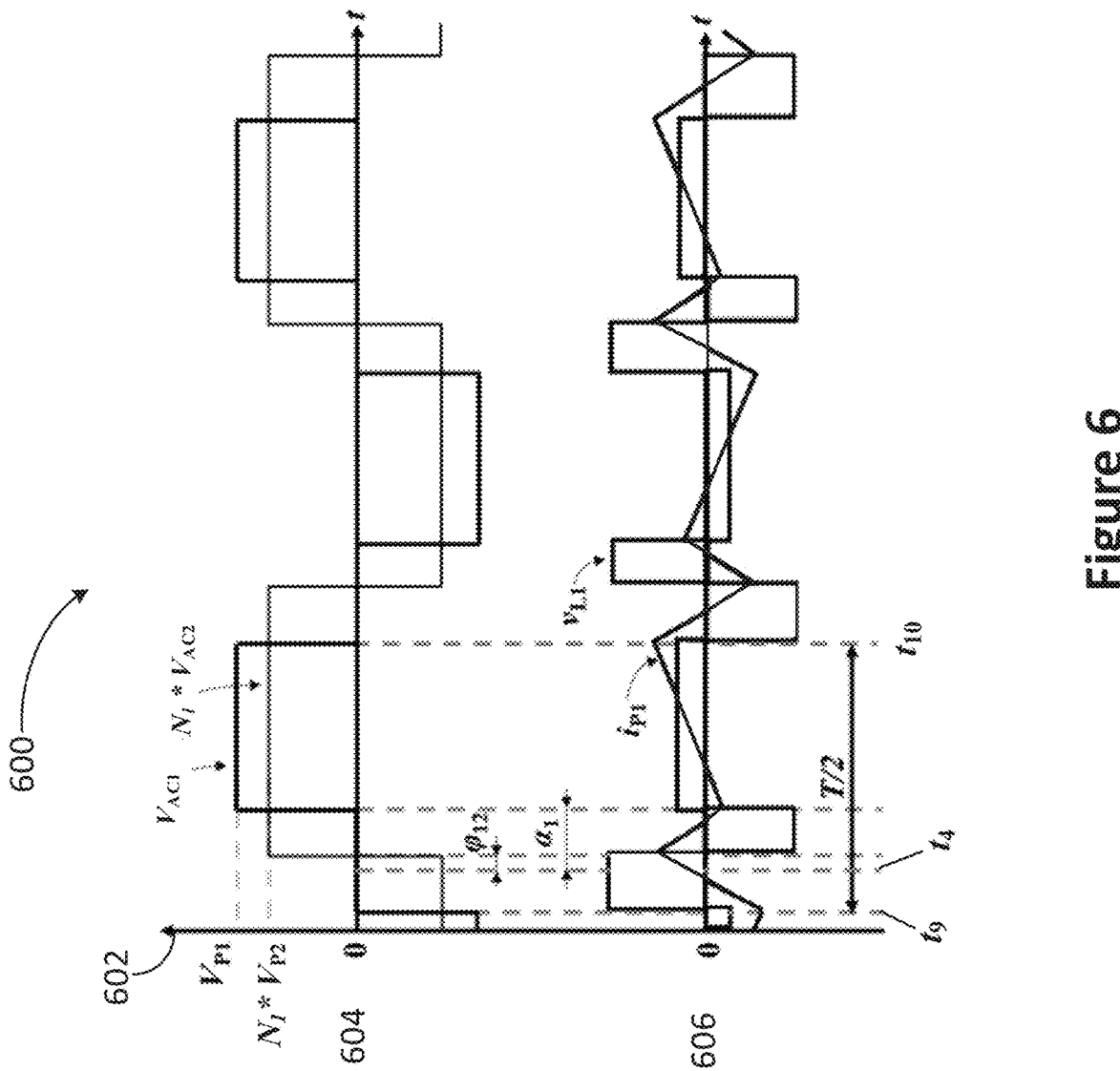
FIG. 6 illustrates graphs showing examples of primary waveforms generated by an exemplary first control loop during a third control mode.

FIG. 6 illustrates graphs 600 showing representative waveforms corresponding to the third control mode. Graphs 600 depict time along a horizontal axis t increasing to the right, and magnitude along a vertical axis 602 increasing upwards. A half cycle T/2 of the first AC voltage $V_{AC1}$ is marked along the horizontal axis beginning at time $t_9$ and ending at time $t_{10}$. The nominal switching time of the first AC voltage $V_{AC1}$ is marked as $t_4$.

The upper graphs 604 show the first AC voltage $V_{AC1}$ and the second AC voltage $V_{AC2}$ with the second AC voltage $V_{AC2}$ being adjusted by the first transformer turns ratio $N_1$. The voltage of the first DC power source $V_{p1}$ and the voltage of the second DC power source $V_{p2}$ adjusted for the first transformer turns ratio $N_1*V_{p2}$ are marked on the vertical axis 602. In the third control mode the first internal phase shift $\alpha_1$ is greater than zero resulting in the first AC voltage $V_{AC1}$ having three voltage levels: $+V_{p1}$, $-V_{p1}$, and zero. The first internal phase shift $\alpha_1$ is shown as a time or a phase difference between the nominal transition time $t_4$ and the rising edge of the first AC voltage $V_{AC1}$. The first external phase shift $\varphi_{12}$ is shown in graph 606 as the time between the nominal transition time $t_4$ and a rising edge of the second AC voltage $V_{AC2}$. The lower graphs 606 show the corresponding voltage $v_{L1}$ and current $i_{p1}$ in the first inductor $L_{130}$.

Control objectives for the DABSR converter formed between the second port 104 and the third port 106 are similar to the objectives used for the DAB converter formed between the first port 102 and the second port 104 and include achieving wide ZVS operating range and minimizing the circulating current. The second control loop 154 is configured to achieve these objectives by adapting control parameters including the second external phase shift $\varphi_{23}$ and the switching frequency $f_s$ to regulate power flow between the second port 104 and the third port 106. The internal phase shift of the third AC voltage $V_{AC3}$ is set to zero to avoid increasing the circulating current. Based on the power of the third port 106, which is given in equation (3) above, the second external phase shift $\varphi_{23}$ will vary in the range of minus ninety degrees to positive ninety degrees [−90°, 90°]. The sign of the second external phase shift $\varphi_{23}$ controls the direction of power flow between the second port 104 and the third port 106. With a positive external phase shift $\varphi_{23}$ power flows from the second port 104 to the third port 106, and with a negative external phase shift $\varphi_{23}$ power flows from the third port 106 to the second port 104.

To achieve minimum circulating current within the DABSR converter formed between the second port 104 and the third port 106, the DABSR converter should be operated in buck mode where $V_{p2}>N_2V_{p3}$ or $M_{23}<1$. The external phase shift $\varphi_{23}$ for buck mode should follow the relation shown in equation (18):

$$\varphi_{23}=\cos^{-1}(M_{23}) \qquad \text{Equation (18)}$$

Equation (18) shows that the second external phase shift $\varphi_{23}$ depends on the voltage gain $M_{23}$ between the second port 104 and the third port 106. Equation (5) shows that the gain $M_{23}$ depends on the voltage level of the second DC power source $V_{p2}$ and the voltage of the third DC power source $V_{p3}$. In some embodiments, the voltage levels $V_{p2}$ and $V_{p3}$ are controlled by a high voltage battery and a low voltage battery and cannot be changed. In these embodiments, the second external phase shift $\varphi_{23}$ cannot be varied freely. Alternatively, the switching frequency $f_s$ can be used to modulate the power levels at the second port 104 and the third port 106.

The minimum switching frequency $f_{min}$ of the converter should be higher than the resonant frequency $f_r$ of the series resonant impedance 128 as given by equation (19):

$$f_r = \frac{1}{2\pi\sqrt{L_{132}C_{134}}} \qquad \text{Equation (19)}$$

The difference between the minimum switching frequency $f_{min}$ and the resonant frequency $f_r$ depends on the maximum allowable voltage stress on the inductor $L_{132}$ and the capacitor $C_{134}$. In some embodiment the ratio between the minimum switching frequency $f_{min}$ and the resonant frequency $f_r$ is about 0.8 to 0.95. Once the switching frequency $f_s$ reaches a predetermined maximum value $f_{max}$, the second external phase shift $\varphi_{23}$ is varied to further reduce the output power $P_{o3}$.

Figure 7:
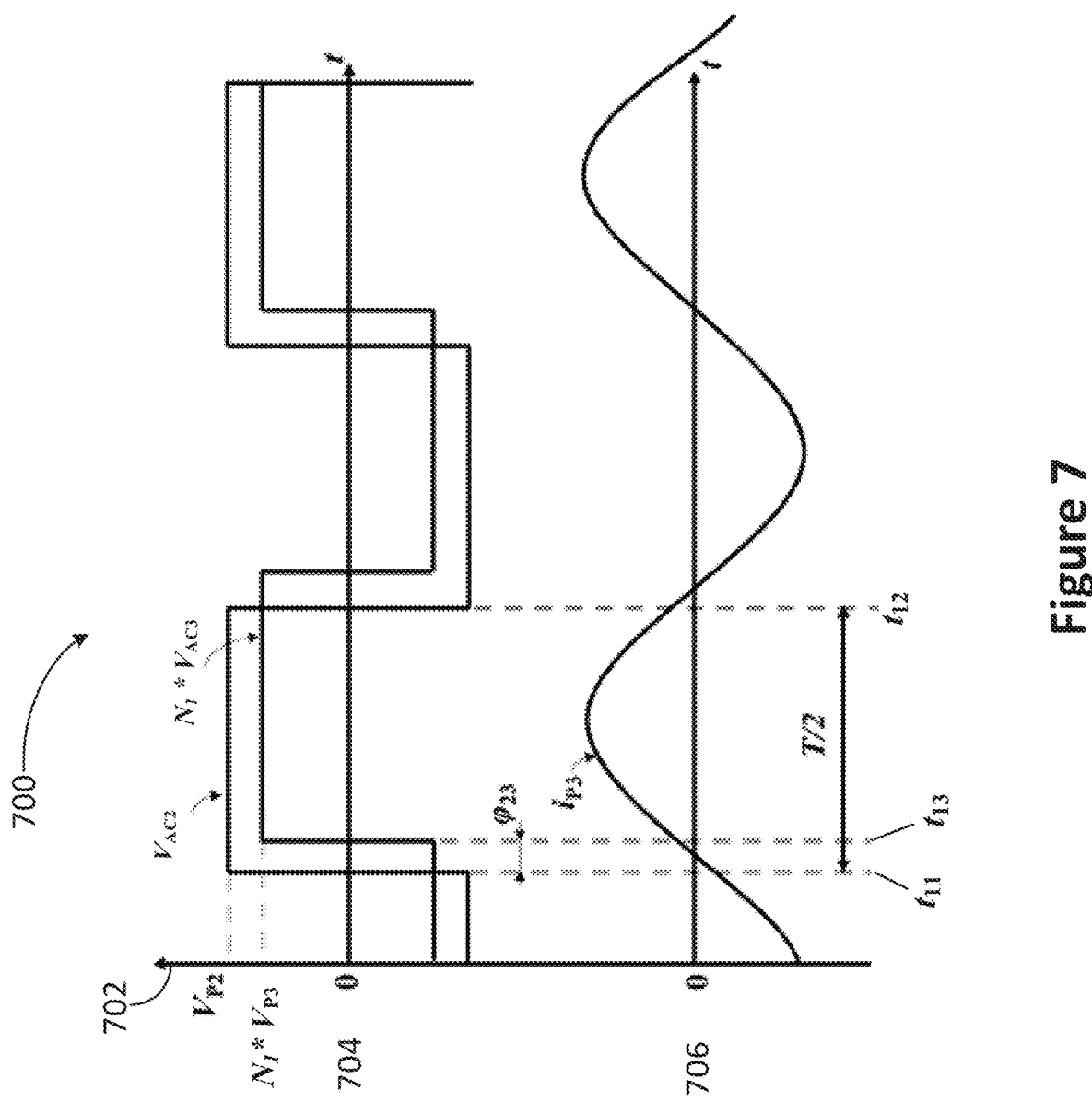
FIG. 7 illustrates graphs showing examples of primary waveforms for an exemplary second control loop.

FIG. 7 illustrates graphs 700 showing representative waveforms for the DAB SR converter formed between the second port 104 and the third port 106. Graphs 700 depict time along a horizontal axis t increasing to the right, and magnitude along a vertical axis 702 increasing upwards. A half cycle T/2 of the first AC voltage $V_{AC2}$ is marked along the vertical axis beginning at time $t_{11}$ and ending at time $t_{12}$. The second external phase shift $\varphi_{23}$ is shown as a phase shift or time delay between time $t_{11}$ and time $t_{13}$.

The upper graphs 704 show the second AC voltage $V_{AC2}$ and the third AC voltage $V_{AC3}$ with the third AC voltage $V_{AC3}$ being adjusted by the second transformer turns ratio $N_2$. The voltage of the second DC power source $V_{p2}$ and the voltage of the third DC power source $V_{p3}$ adjusted for the second transformer turns ratio $N_{2*}V_{p3}$ are marked on the vertical axis 702. As noted above there is no internal phase shift in either the second AC voltage $V_{AC2}$ or the third AC voltage $V_{AC3}$ making both these AC voltages two level waveforms. The lower graphs 706 shows current $i_{p3}$ flowing through the resonant inductor $L_{132}$. The resonant tank formed by the series resonant impedance 128 leads to a nearly sinusoidal current as shown in the graph 706.

In some embodiments, the first port 102 may become idle. An idle port is one that is neither delivering nor receiving power. This can occur for example in an EV application where the first port 102 is a charging port connected through a PFC converter to grid power, the second port 104 is the HV battery port and the third port 106 is the LV battery port. While the example EV is being driven, the first port 102, which is the PFC port, will be idle and only the HV and LV battery ports are transferring power. The first transformer $T_1$ integrates the first port 102 with the second port 104, so simply turning the switching devices in the first full bridge switching network 208 off would lead to the body diodes of the switching devices of the first port 102 to conduct and the output voltage $V_{P1}$ of the first port 102 would continually increase. Uncontrolled increase of $V_{P1}$ could exceed the voltage rating of the bus capacitor C1 and the switching devices $S_1$, $S_2$, $S_3$, $S_4$ resulting in converter failure. To avoid this failure, the voltage $V_{P1}$ of the first port 102 should be regulated by keeping the net power $P_{o1}$ produced by the first port 102 close to zero.

In one embodiment, the above-described uncontrolled voltage increase is avoided by maintaining the voltage gain $M_{12}$ between the first port 102 and the second port 104 to be close to or substantially one. Maintaining a gain $M_{12}$ of one provides a wider ZVS range and minimizes the circulating currents. In general, a gain of substantially one should be maintained between the idle port and whichever remaining port is supplying power. In the EV example described above, the first port is the charging port which is idle while driving, the second port is the HV battery port which drives the motor, and the third port is the LV battery port, which is supplying power to the motor. Thus, during driving a gain of one should be maintained between the first port and the third port. During LV battery charging, the first port is supplying power to the LV battery through the third port and the second port is idling. Thus, during charging a gain of one should be maintained between the idle second port and the first port which is supplying power for charging the LV battery. While HV battery charging, the first port is supplying power to the HV battery and the third port is idling. Thus, during HV battery charging a gain of one should be maintained between the idle third port and the second port.

Referring once again to FIG. 1, the controller 150 is configured to receive DC voltage signals $V_{DC1}$, $V_{DC2}$, and $V_{DC3}$ corresponding to the DC voltages at each of the three ports 102, 104, 106, and produce control signals $C_1$, $C_2$, . . . , $C_2$ configured to operate the full bridge switching networks 108, 110, 112. The controller 150 is configured to adapt the control signals $C_1$, $C_2$, . . . , $C_{12}$ to regulate power flow among the three ports 102, 104, 106. Each of the voltage signals $V_{DC1}$, $V_{DC2}$, $V_{DC3}$ is proportional to a DC voltage at each of the DC power rails 114, 116, 118, respectively.

The voltage signals $V_{DC1}$, $V_{DC2}$, $V_{DC3}$ may be sampled and processed digitally by the controller 150 using a micro-controller unit. Alternatively, the controller 150 may receive the voltage signals $V_{DC1}$, $V_{DC2}$, $V_{DC3}$ as analog signals or a combination of analog and digital signals and generate the control signals $C_1$, $C_2$, . . . , $C_{12}$ using any suitable combination of digital and analog circuitry.

FIG. 8 illustrates equivalent delta transformations 800 of the power converter topology 136 illustrated in FIG. 1 showing the four possible power flow scenarios. Impedance $Z_1$ is the impedance given in equation (8) above and the impedance represents the impedance $Z_3$ given in equation (9) above reflected across the transformer $T_1$.

In the first scenario 802, the first port 102 is sending power to the second port 104 and the second port 104 is sending power to the third port 106. In the second scenario 804, both the first port 102 and the third port 106 are sending power to the second port 104. In the third scenario 806, the second port 104 is sending power to both the first port 102 and the third port 106. In the fourth scenario 808, the third port 106 is sending power to the second port 104 and the second port 104 is sending power to the first port 102.

Figure 9:
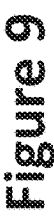
FIG. 9 illustrates an exemplary dual loop control methodology adapted to control a hybrid three-port DC-DC power converter.

FIG. 9 illustrates a block diagram showing details of a control methodology 900 appropriate for controlling the hybrid three-port DC-DC power converter topology 136 descried above. The exemplary control methodology 900 may be performed by the controller 150 and is configured to operate the three full bridge switching networks 108, 110, 112. The controller 150 includes two independent control loops 152, 154 where the first control loop 152 is configured to regulate the DAB converter formed between the first port 102 and the second port 104, and the second control loop 154 is configured to regulate the DABSR converter formed between the second port 104 and the third port 106.

As used herein, the term control loop refers to a feedback mechanism where a desired sensed signal is compared with a reference signal, referred to as a controlled voltage, to create an error signal representing the difference between the desired output and the actual output. The control loop then adjusts the value of one or more control parameters which are used to operate the system being controlled in a way that drives the error signal to zero.

As an aid to understanding, operation of the exemplary control methodology 900 will be discussed with respect to the first power flow scenario 802, and will then be expanded to handle the remaining power flow scenarios 804, 806, 808. To implement the first power flow scenario 802 the first control loop 152 is configured to regulate the voltage $V_{P2}$ of the second port 104. This is accomplished by setting the first controlled voltage $V_{C1}$ to the second DC voltage $V_{DC2}$ which is proportional to a voltage of the second port $V_{P2}$. The first control loop 152 compares the first controlled voltage $V_{C1}$ with a desired reference signal $V_{ref1}$ to create a first error signal $e_{DAB}$, representing a difference between the reference signal $V_{ref1}$ and the actual voltage at the second port 104.

A first control signal $\Delta\varphi$ is generated by applying a control algorithm 902 to the error signal eDAB. In one embodiment, the control algorithm 902 includes proportional plus integral (PI) compensation. Alternatively, any suitable compensation algorithm may be used to determine the first control signal $\Delta\varphi$ based on the first error signal $e_{DAB}$. As described above, a gain $M_{12}$ and a mode signal $\varphi'_{12}$ are determined as shown in equation (4) and equation (8), then the control parameters $\alpha_1$, $\varphi_{12}$ are generated based on the control mode 910.

The control mode is determined based on the boundary condition described above in equations (10) through equation (17). When the first control signal $\Delta\varphi$ is greater than or equal to the mode signal $\varphi'_{12}$ ($\Delta\varphi \geq \varphi'_{12}$), the first control mode is used, during which the first external phase shift $\varphi_{12}$ is set to the control signal $\Delta\varphi$ and the first internal phase shift $\alpha_1$ is set to zero. When the control signal $\Delta\varphi$ is greater than zero and less than the mode signal $\varphi'_{12}$ ($0 < \Delta\varphi < \varphi'_{12}$), the second control mode is used, during which the first external phase shift $\varphi_{12}$ is set equal to the mode signal $\varphi'_{12}$, and the first internal phase shift $\alpha_1$ is set to a difference between the mode signal and the first control signal ($\varphi'_{12} - \Delta\varphi$). When the first control signal $\Delta\varphi$ is less than or equal to zero ($\Delta\varphi < 0$), the third control mode is used, during which the first external phase shift $\varphi_{12}$ is generated based on a sum of the mode signal $\varphi'_{12}$ and the first control signal $\Delta\varphi$, and the first internal phase shift $\alpha_1$ is set according to equation (17).

In the first power flow scenario 802, the second control loop 154 is configured to regulate the voltage $V_{P3}$ of the third port 106. Regulation of the voltage $V_{P3}$ is accomplished by setting the second controlled voltage $V_{C2}$ to the third DC voltage $V_{DC3}$ which is proportional to a voltage of the third port $V_{P3}$. The second control loop 154 compares the second controlled voltage $V_{C2}$ with a desired second reference signal $V_{ref2}$ to create a second error signal $e_{DABSRC}$, representing a difference between the desired voltage and the actual voltage at the third port 106.

A control frequency $f_{sPI}$ is generated by applying a control algorithm 904 to the second error signal $e_{DABSRC}$, and a second control signal $\varphi_{23PI}$ is generated by applying another control algorithm 906 to the error signal $e_{DABSR}$. In the illustrated embodiment, the compensation algorithms 904 and 906 are PI controllers. Alternatively, any appropriate compensation algorithms may be used in either or both of the control algorithms 904 and 906 without straying from the spirit and scope of the embodiments.

When the control frequency $f_{sPI}$ is not greater than a predetermined maximum switching frequency $f_{smax}$, the switching frequency $f_s$ is set to the control frequency $f_{sPI}$ and the second external phase shift $\varphi_{23}$ shift is set to the second control signal $\varphi_{23PI}$. When the control frequency $f_{sPI}$ is not greater than a predetermined maximum switching frequency $f_{smax}$, the switching frequency $f_s$ is set to the predetermined maximum switching frequency $f_{smax}$, and the second external phase shift $\varphi_{23}$ is set to a phase shift value $\varphi_{23}'$ based on the gain $M_{23}$ between the third port 106 and the second port 104. In one embodiment the phase shift value $\varphi_{23}'$ is generated by applying in inverse cosine operation ($\cos^{-1}$) to the gain $M_{23}$.

The control signal generator 156 generates control signals 158 configured to drive the full bridge switching networks 108, 110, 112 based on the four control parameters $\alpha_1$, $\varphi_{12}$, $\varphi_{23}$, $f_s$. The control signal generator may include pulse width modulation (PWM) techniques to generate the control signals 158. Alternatively, any appropriate technique may be advantageously employed to configure the control signals 158 to generate the AC voltages $V_{AC1}$, $V_{AC2}$, $V_{AC3}$ in accordance with the control parameters.

Because the same switching frequency $f_s$ is used in all three full bridge rectifiers, changes in the switching frequency effects both control loops 152, 154. This coupling can be mitigated by having different bandwidths in each of the control loops 152, 154. Setting the bandwidth of the first control loop 152 to a lower frequency than the bandwidth of the second control loop 154, will allow disturbances at the third port 106 to affect the first control loop 152, thereby resulting in poor dynamic response of the first control loop 152. This coupling between the third port 106 and the first port 102 can be mitigated by setting the bandwidth of the second control loop 154, which is generating the switching frequency $f_s$ of all three ports 102, 104, 106, to a lower frequency than the bandwidth of the first control 152.

The above discussion of the control methodology 900 creates the first power flow scenario 802 where power is flowing from the first port 102 to the second port 104 and from the second port 104 to the third port 106. The remaining three power flow scenarios 804, 806, 808 can be facilitated simply by changing the inputs to the control methodology 900.

In the second power flow scenario 804, power is flowing from the first port 102 to the second port 104 and power is flowing from the third port 106 to the second port 104. The first controlled voltage $V_{C1}$ is set to the second DC voltage $V_{DC2}$ and the second controlled voltage $V_{C2}$ is also set equal to the second DC voltage $V_{DC2}$. In the first power flow scenario 802 described above, power is flowing from the second port 104 to the third port 106. To reverse this power flow and have power flowing from the third port 106 to the second port 104, the sign of the second external phase shift $\varphi_{23}$ is inverted. This is illustrated in the control methodology 900 as setting the second direction signal $d_2$ to −1.

In the third power flow scenario 806, power is flowing from the second port 104 to both the first port 102 and the third port 106. To facilitate this power flow 806, the first controlled voltage $V_{C1}$ is set to the first DC voltage $V_{DC1}$ and the second controlled voltage $V_{C2}$ is set equal to the third DC voltage $V_{DC3}$. To reverse power flow between the first port 102 and the second port 104, the sign of the first external phase shift $\varphi_{12}$ is inverted by setting the first direction signal $d_1$ to −1.

In the fourth power flow scenario 808, power is flowing from the second port 104 to the first port 102, and from the third port 106 to the second port 104. To facilitate this power flow 808, the first controlled voltage $V_{C1}$ is set to the first DC voltage $V_{DC1}$ and the second controlled voltage $V_{C2}$ is set equal to the second DC voltage $V_{DC2}$. To reverse power flow between the first port 102 and the second port 104, the sign of the first external phase shift $\varphi_{12}$ is inverted by setting the first direction signal $d_1$ to −1. To reverse power flow between the second port 104 and the third port 106, the sign of the second external phase shift $\varphi_{23}$ is inverted by setting the second direction signal $d_2$ to −1.

In some embodiments, it may be desirable to control the current being delivered by one or more of the ports 102, 104, 106. The control methodology 900 is appropriate for regulating current in the topology 136. To achieve current control, either or both the first controlled voltage $V_{C1}$ and the second controlled voltage $V_{C2}$ are set to a value that is proportional to a current flowing through the desired power source $P_1$, $P_2$, $P_3$.

FIG. 10 illustrates a flow diagram of an exemplary method 1000 for controlling a hybrid three-port DC-DC power converter. The exemplary method 1000 is appropriate for controlling the converter topology 136 described above and with reference to FIG. 1.

The exemplary method regulates 1002 power transfer between the first port 102 and the second port 104 using a first control loop 152. The first control loop 152 receives a first DC voltage $V_{DC1}$ and a second DC voltage $V_{DC2}$, and generates a first internal phase shift $\alpha_1$ and a first external phase shift $\varphi_{12}$. In one embodiment, the first internal phase shift $\alpha_1$ and a first external phase shift $\varphi_{12}$ are used to operate the first and second full bridge switching networks 108, 110 to generate a first AC voltage $V_{AC1}$ and a second AC voltage $V_{AC1}$ corresponding to the desired first internal phase shift $\alpha_1$ and a first external phase shift $\varphi_{12}$.

The method 1000 regulates 1004 power transfer between the second port 104 and the third port 106 using a second control loop 154. The second control loop 154 receives a second DC voltage $V_{DC2}$ and a third DC voltage $V_{DC3}$, and generates a switching frequency $f_s$ and a second external phase shift $\varphi_{23}$. The first DC voltage $V_{DC1}$, second DC voltage $V_{DC2}$, and third DC voltage $V_{DC3}$ are proportional to voltages of the first port $P_1$, the second port $P_2$, and the third port $P_3$ respectively. The switching frequency $f_s$ is used to operate all three full bridge switching networks 108, 110, 112 leading to all three AC voltages $V_{AC1}$, $V_{AC2}$, $V_{AC3}$ having the same switching frequency $f_s$. The second external phase shift $\varphi_{23}$ controls the phase shift between the second AC voltage $V_{AC2}$ and the third AC voltage $V_{AC3}$.

The second internal phase shift of the second AC voltage $V_{AC2}$ is set to zero and the third internal phase shift of the third AC voltage $V_{AC3}$ is set to zero. Zero internal phase shift leads to a second AC voltage $V_{AC2}$ and a third AC voltage $V_{AC3}$ having two voltage waveforms.

The bandwidth of the first control loop 152 is configured to be higher than the bandwidth of the second control loop 154. Having a higher bandwidth in the first control loop 152 provides decoupling between the two control loops 152, 154 allowing each loop to be independently controlled.

When one of the ports is idling, the gain between the idling port and an adjacent port is maintained at substantially one. Regulating the idling port prevents high voltage stresses and possible converter failure.

Figure 11:
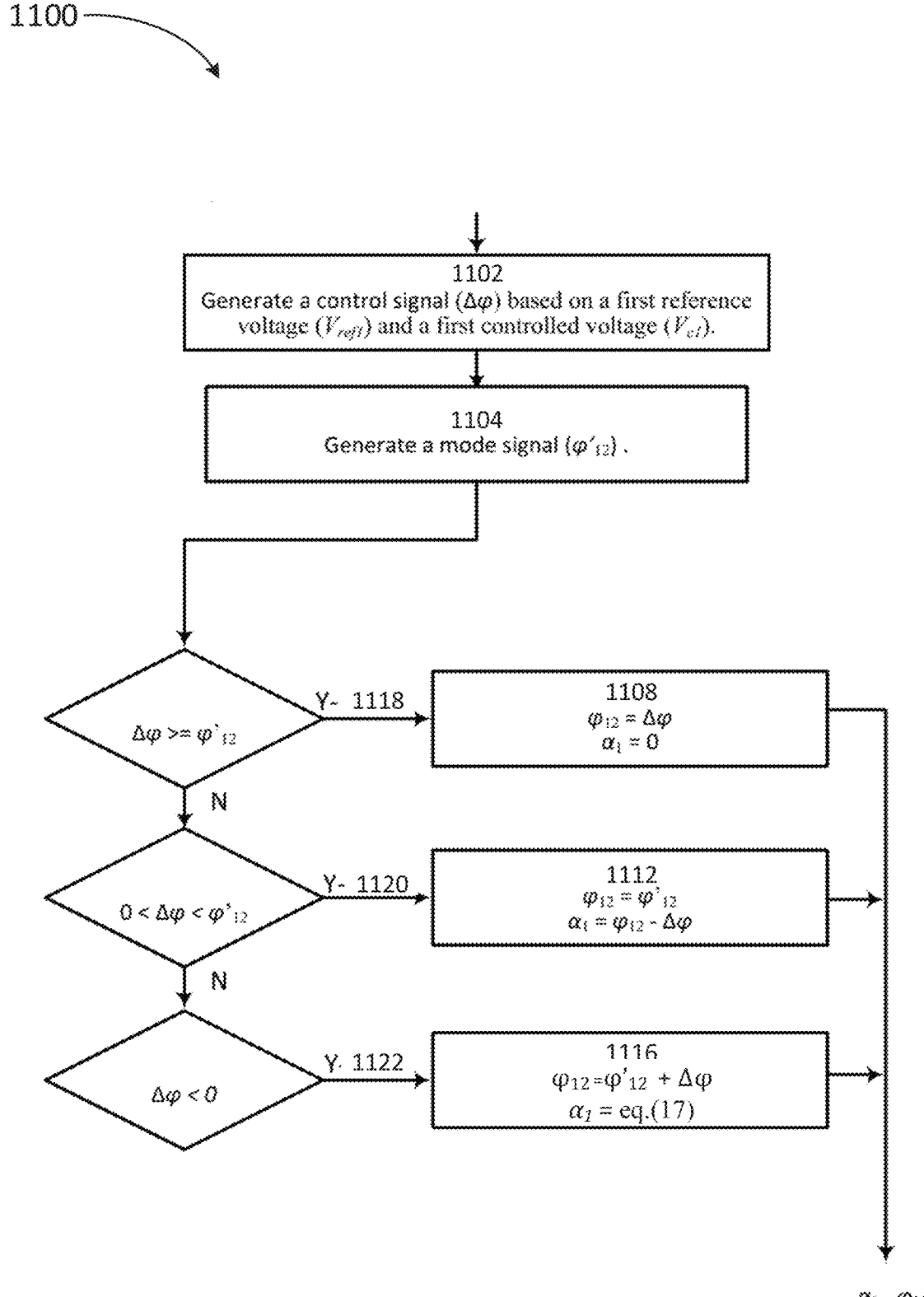
FIG. 11 illustrates a flow diagram of an exemplary three-mode control strategy configured to control the dual active bridge converter portion of a hybrid three-port DC-DC power converter.

FIG. 11 illustrates a flow diagram of an exemplary three-mode control method 1100 configured to control the DAB converter portion of a hybrid three-port DC-DC power converter incorporating aspects of the embodiments. The exemplary control method 1100 is an appropriate for use in the first control loop 152 of apparatus 100 described above.

A first control signal $\Delta\varphi$ is generated 1102 based on a first controlled DC voltage $V_{c1}$ and a first reference voltage $V_{ref1}$. The first control signal $\Delta\varphi$ is generated by applying a control algorithm to an error signal representing a difference between the first reference voltage $V_{ref1}$ and the controlled voltage $V_{c1}$. When transferring power from the first port 102 to the second port 104 the first controlled voltage $V_{c1}$ is set based on the voltage of the second port $V_{P2}$, and when power is being transferred from the second port 104 to the first port 102 the first controlled voltage $V_{c1}$ is set based on a voltage of the first port $V_{P1}$.

A mode signal $\varphi'_{12}$ is generated 1104 based on the first controlled voltage $V_{c1}$ and a voltage gain between the first port 102 and the second port 104 as described above and with reference to equation (8). A control mode is then selected based on the mode signal $\varphi_{12}$.

When the first control signal $\Delta\varphi$ is greater than or equal to the mode signal 1118, the first external phase shift $\varphi_{12}$ is set to the first control signal $\Delta\varphi$, and the first internal phase shift $\alpha_1$ is set to zero 1108. When the first control signal $\Delta\varphi$ is greater than zero and less than the mode signal $\varphi_{12}$ 1120, the first external phase shift $\varphi_{12}$ is set to the mode signal $\varphi'_{12}$, and the first internal phase shift is set to a difference between the first external phase shift al and the first control signal $\Delta\varphi$ 1112. When the first control signal is less than or equal to zero 1122, the first external phase shift $\varphi_{12}$ is set to the mode signal $\varphi'_{12}$ plus the first control signal $\Delta\varphi$, and the first internal phase shift is set according to equation (17) 1116.

Figure 12:
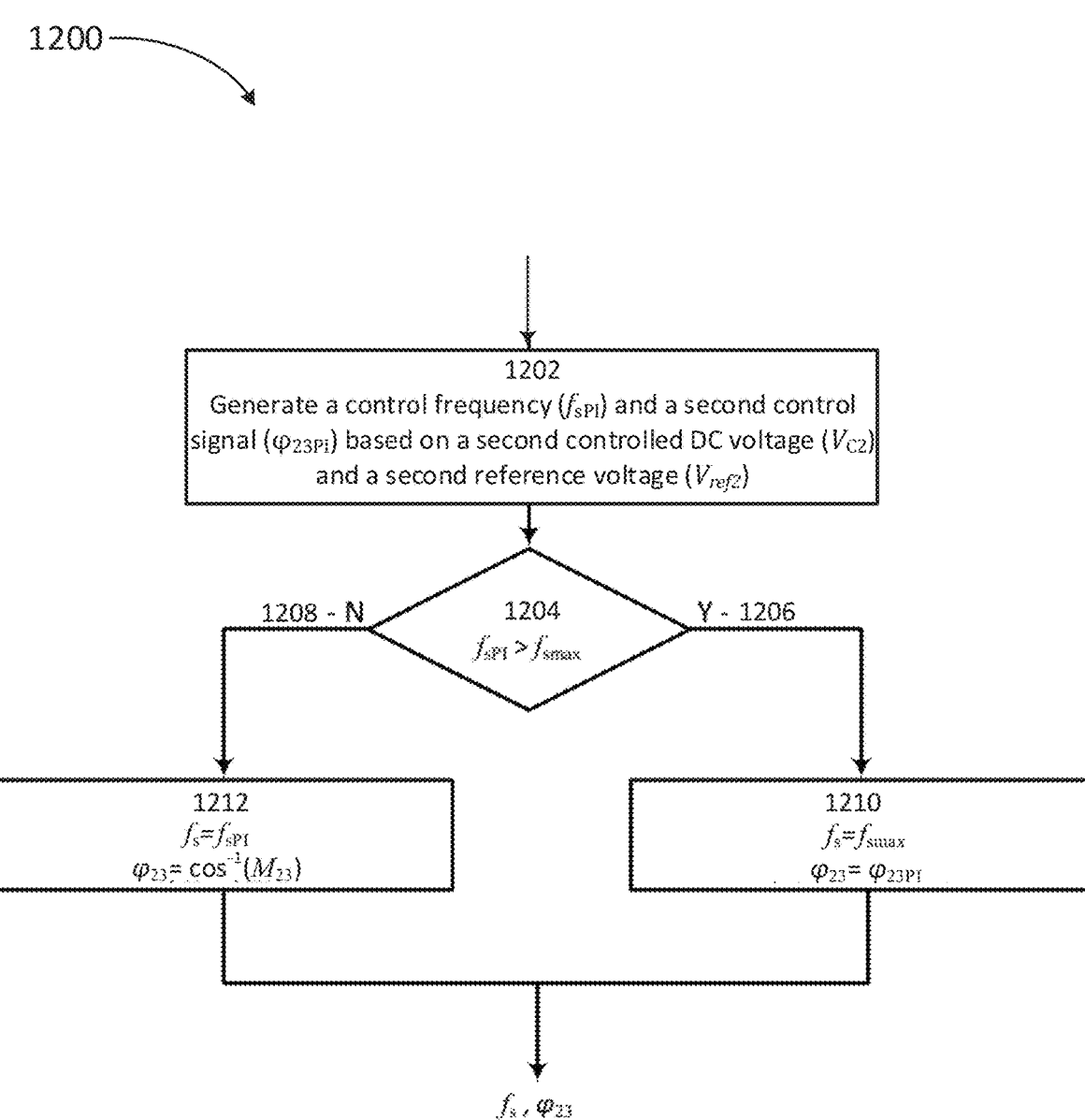
FIG. 12 illustrates a flow diagram of an exemplary control method configured to control the DAB SR converter portion of a hybrid three-port DC-DC power converter.

FIG. 12 illustrates a flow diagram of an exemplary control method 1200 configured to control the DAB SR converter portion of a hybrid three-port DC-DC power converter. The exemplary control method 1200 is an appropriate control method for use in the second control loop 154 of apparatus 100 described above.

The control method 1200 generates 1202 a control frequency $f_{sPI}$ and a second control signal $\varphi_{23PI}$ based on a second controlled DC voltage $V_{C2}$ and a second reference voltage $V_{ref2}$. As described above the second controlled DC voltage may be set according to the desired power flow scenario. The control frequency $f_{sPI}$ is then compared 1204 with a predetermined maximum switching frequency $f_{smax}$.

When the control frequency $f_{sPI}$ is greater than 1206 the predetermined maximum switching frequency $f_{smax}$, the switching frequency $f_s$, which is a control parameter of the second control loop, is set 1210 to the maximum switching frequency $f_{smax}$, and the second external phase shift $\varphi_{23}$ is set 1210 the output of the phase controller $\varphi_{23PI}$. Thus, when the output of the frequency controller $f_{sPI}$ saturates, the phase controller output $\varphi_{23PI}$ is used to compensate the second control loop.

When the control frequency $f_{sPI}$ is not greater than 1208 the predetermined maximum switching frequency $f_{smax}$, the switching frequency $f_s$ is set 1212 to the control frequency $f_{sPI}$, and the second external phase shift $\varphi_{23}$ is set 1212 to an inverse cosine of the gain $M_{23}$ between the second port and the third port.

The determined control parameters $f_s$ and $\varphi_{23}$ may then be used, for example, in the exemplary control signal generator 156 described above to generate control signals 158 to drive the converter topology 136.

Thus, while there have been shown, described and pointed out, features of the embodiments, it is understood that various omissions, substitutions and changes in the form and details of devices and methods illustrated, and in their operation, may be made by those skilled in the art without departing from the spirit and scope of the embodiments. Further, it is expressly intended that all combinations of those elements, which perform substantially the same function in substantially the same way to achieve the same results, are within the scope of the embodiments. Moreover, it should be recognized that structures and/or elements shown and/or described in connection with any form or embodiment may be incorporated in any other form or embodiment as a general matter of design choice.

What is claimed is:

1. An apparatus, comprising:
a hybrid three-port DC-DC power converter, wherein a first AC power generated by a first port is coupled to a second AC power generated by a second port through an inductive network comprising a first transformer and a first inductor, and the second AC power is coupled to a third AC power generated by a third port through a series resonant network comprising a second transformer and a second inductor coupled in series with a capacitor; and
a controller configured to
receive a first DC voltage from the first port, a second DC voltage from the second port, and a third DC voltage from the third port,
produce switch control signals, wherein the switch control signals are configured to generate the first AC power, the second AC power, and the third AC power based on one or more control parameters comprising a first internal phase shift, a first external phase shift, a switching frequency, and a second external phase shift, use a first control loop to regulate power transfer between the first port and the second port, wherein the first control loop is configured to:

receive the first DC voltage and the second DC voltage generate a first control signal based on a first controlled DC voltage and a first reference voltage, generate a mode signal based on the first controlled DC voltage and a voltage gain between the first DC voltage and the second DC voltage, generate the first internal phase shift and the first external phase shift; and use a second control loop to regulate power transfer between the second port and the third port, wherein the second control loop is configured to;

receive the second DC voltage and the third DC voltage, generate a control frequency and a second control signal based on a second controlled DC voltage and a second reference voltage, and generate the switching frequency and the second external phase shift.

2. The apparatus of claim 1, wherein the controller is configured to set a second internal phase shift within the second AC power to zero and set a third internal phase shift within the third AC power to zero.

3. The apparatus of claim 1, wherein the controller is further configured to decouple the first control loop from the second control loop by setting a bandwidth of the first control loop higher than a bandwidth of the second control loop.

4. The apparatus of claim 1, wherein the controller is configured to, when one of the first port, the second port, and the third port is idling, regulate a voltage gain between the idling port and an adjacent port to maintain a voltage gain of substantially one.

5. The apparatus of claim 1, wherein, when power is being delivered from the first port to the second port, the first controlled DC voltage is set to the second DC voltage, and when power is being delivered from the second port to the first port, the first controlled DC voltage is set to the first DC voltage;

when the first control signal is greater than or equal to the mode signal, generate the first external phase shift based on the first control signal and set the first internal phase shift to zero;

when the first control signal is greater than zero and less than the mode signal, generate the first external phase shift based on the mode signal, and generate the first internal phase shift based on a difference between the mode signal and the first control signal; and when the first control signal is less than or equal to zero, generate the first external phase shift based on the mode signal and the first control signal, and generate the first internal phase shift based on the first controlled DC voltage and a voltage gain between the first DC voltage and the second DC voltage.

6. The apparatus of claim 1, wherein the first control loop is operated in buck mode.

7. The apparatus of claim 1, wherein, when power is being delivered from the third port to the second port the second controlled DC voltage is set to the second DC voltage, and when power is being delivered from the second port to the third port the second controlled DC voltage is set to the third DC voltage;

when the control frequency is greater than a maximum switching frequency, set the switching frequency to the maximum switching frequency, and generate the second external phase shift corresponding to the second control signal;

when the control frequency is not greater than the maximum switching frequency, generate the switching frequency corresponding to the control frequency and generate the second external phase shift based on a gain between the second DC voltage and the third DC voltage.

8. The apparatus of claim 1, wherein the controller is further configured to generate the second external phase shift by applying an inverse cosine function to the gain between the second DC voltage and the third DC voltage.

9. The apparatus of claim 1, wherein the second control loop is operated in buck mode.

10. A method for controlling a hybrid three-port DC-DC converter, the method comprising:

regulate power transfer between a first port and a second port using a first control loop;

receive, with the first control loop, a first DC voltage and a second DC voltage;

generate, with the first control loop, a first control signal based on a first controlled DC voltage and a first reference voltage;

generate, with the first control loop, a mode signal based on the first controlled DC voltage and a voltage gain between the first DC voltage and the second DC voltage;

generate, with the first control loop, a first internal phase shift and a first external phase shift; and regulate power transfer between the second port and a third port using a second control loop, receive, with the second control loop, the second DC voltage and a third DC voltage;

generate, with the second control loop, a control frequency and a second control signal based on a second controlled DC voltage and a second reference voltage; and generate, with the second control loop, a switching frequency and a second external phase shift.

11. The method of claim 10, further comprising setting a second internal phase shift to zero and setting a third internal phase shift to zero.

12. The method of claim 10, further comprising setting a bandwidth of the first control loop to a higher frequency than a bandwidth of the second control loop.

13. The method of claim 10, further comprising, when one of the first port, the second port, or the third port is idling, regulating a voltage gain between the idling port and an adjacent port to maintain a voltage gain of substantially one.

14. The method of claim 10, wherein, when power is being delivered from the first port to the second port, the first controlled DC voltage is set to the second DC voltage, and when power is being delivered from the second port to the first port, the first controlled DC voltage is set to the first DC voltage;

when the first control signal is greater than or equal to the mode signal, generating the first external phase shift based on the first control signal, and set the first internal phase shift to zero;

when the first control signal is greater than zero and less than the mode signal, generating the first external phase shift based on the mode signal, and generate the first internal phase shift based on a difference between the mode signal and the first control signal; and when the first control signal is less than or equal to zero, generating the first external phase shift ($\varphi_{12}$) based on a sum of the mode signal and the first control signal, and generate the first internal phase shift based on the first controlled DC voltage and a voltage gain between the first DC voltage and the second DC voltage.

15. The method of claim 10, wherein, when power is being delivered from the third port to the second port the second controlled DC voltage is set to the second DC voltage, and when power is being delivered from the second port to the third port the second controlled DC voltage is set to the third DC voltage;

when the control frequency is greater than a maximum switching frequency, setting the switching frequency to the maximum switching frequency, and generate the second external phase shift corresponding to the second control signal;

when the control frequency is not greater than the maximum switching frequency, generating the switching frequency corresponding to the control frequency and generate the second external phase shift based on a gain between the second DC voltage and the third DC voltage.

16. An apparatus comprising:

a hybrid three-port DC-DC power converter, wherein a first AC power generated by a first port is coupled to a second AC power generated by a second port through an inductive network comprising a first transformer and a first inductor, and the second AC power is coupled to a third AC power generated by a third port through a series resonant network comprising a second transformer and a second inductor coupled in series with a capacitor; and a controller configured to:

receive a first DC voltage from the first port, a second DC voltage from the second port, and a third DC voltage from the third port, produce switch control signals, wherein the switch control signals are configured to generate the first AC power, the second AC power, and the third AC power based on one or more control parameters comprising a first internal phase shift, a first external phase shift, a switching frequency, and a second external phase shift, use a first control loop to regulate power transfer between the first port and the second port, wherein the first control loop is configured to:

receive the first DC voltage and the second DC voltage, generate a first control signal based on a first controlled DC voltage and a first reference voltage, generate a mode signal based on the first controlled DC voltage and a voltage gain between the first DC voltage and the second DC voltage, and generate the first internal phase shift and the first external phase shift; and use a second control loop to regulate power transfer between the second port and the third port, wherein the second control loop is configured to:

receive the second DC voltage and the third DC voltage, and generate the switching frequency and the second external phase shift.

* * * * *